US012607608B2

(12) United States Patent
Sengupta et al.

(10) Patent No.: US 12,607,608 B2
(45) Date of Patent: Apr. 21, 2026

(54) ELECTROLYTIC DEVICE NOISE REDUCTION AND LIFETIME IMPROVEMENT USING MODULATED DRIVER

(71) Applicant: Dionex Corporation, Sunnyvale, CA (US)

(72) Inventors: Mrinal K. Sengupta, Union City, CA (US); George Tang, Saratoga, CA (US); Husam Al-Esawi, El Dorado Hills, CA (US)

(73) Assignee: Dionex Corporation, Sunnyvale, CA (US)

( * ) Notice: Subject to any disclaimer, the term of this patent is extended or adjusted under 35 U.S.C. 154(b) by 791 days.

(21) Appl. No.: 17/969,779

(22) Filed: Oct. 20, 2022

(65) Prior Publication Data

US 2024/0133849 A1 Apr. 25, 2024
US 2024/0230602 A9 Jul. 11, 2024

(51) Int. Cl.
*G01N 30/34* (2006.01)
*G01N 30/62* (2006.01)
*G01N 30/64* (2006.01)

(52) U.S. Cl.
CPC ............. *G01N 30/34* (2013.01); *G01N 30/62* (2013.01); *G01N 30/64* (2013.01); *G01N 2030/345* (2013.01); *G01N 2030/621* (2013.01)

(58) Field of Classification Search
CPC ........ G01N 30/34; G01N 30/62; G01N 30/64; G01N 2030/345; G01N 2030/621
See application file for complete search history.

(56) References Cited

U.S. PATENT DOCUMENTS

| 5,569,365 | A | | 10/1996 | Rabin et al. | |
|---|---|---|---|---|---|
| 6,077,434 | A | * | 6/2000 | Srinivasan | G01N 30/96 |
| | | | | | 204/542 |
| 6,544,484 | B1 | | 4/2003 | Kaufman | |
| 6,568,245 | B2 | | 5/2003 | Kaufman | |
| 9,400,268 | B2 | | 7/2016 | Pohl et al. | |
| 2005/0110499 | A1 | * | 5/2005 | Sunaoka | G01N 27/06 |
| | | | | | 324/442 |
| 2009/0218238 | A1 | | 9/2009 | Dasgupta et al. | |
| 2017/0141000 | A1 | * | 5/2017 | Sakiyama | H01L 21/02274 |
| 2017/0199167 | A1 | | 7/2017 | Dasgupta et al. | |
| 2021/0178334 | A1 | * | 6/2021 | Lu | B01D 61/44 |
| 2021/0178337 | A1 | | 6/2021 | Zhongqing et al. | |
| 2023/0325607 | A1 | * | 10/2023 | Morimoto | G06F 16/3329 |
| | | | | | 704/9 |

FOREIGN PATENT DOCUMENTS

JP 2002 214212 A 7/2002

* cited by examiner

*Primary Examiner* — Paul M. West

(57) ABSTRACT

Systems and methods are described for ion chromatography systems and electrolytic suppressors. By varying the operating frequency of an electrolytic suppressor, the generation of bubbles and noise can be minimized. This leads to more accurate results in e.g., a conductivity detector downstream of an electrolytic suppressor within an ion chromatography system. In certain embodiments, it has been found that frequencies of around 700-750 Hz, 100-150 Hz and 925-975 Hz have achieved the best results.

32 Claims, 17 Drawing Sheets

CR-ATC

CR-CTC

| Frequency Hz | CD Background, µS/cm | CD Baseline Noise, µS/cm |
|---|---|---|
| 0 | 0.245 | *0.356 |
| 5 | 0.251 | 0.36 |
| 10 | 0.242 | 0.293 |
| 120 | 0.226 | 0.278 |
| 480 | 0.149 | 0.351 |
| 500 | 0.236 | 0.319 |
| 600 | 0.139 | 0.301 |
| 720 | 0.091 | *0.262 |
| 840 | 0.095 | 0.28 |
| 960 | 0.1 | 0.28 |
| 1080 | 0.101 | 0.282 |
| 2500 | 0.28 | 0.411 |
| 5000 | 0.264 | 0.342 |
| 15000 | 18 | 20462.168 |

*36% Lower Noise Than Control

SUPPRESSOR 2

| Frequency Hz | CD Background, μS/cm | CD Baseline Noise, nS/cm |
|---|---|---|
| 0 | 0.152 | 0.481 |
| 5 | 0.143 | 0.491 |
| 10 | 0.143 | 0.415 |
| 120 | 0.143 | 0.406 |
| 480 | 0.202 | 0.462 |
| 500 | 0.143 | 0.451 |
| 600 | 0.201 | 0.43 |
| 720 | 0.127 | 0.369 |
| 840 | 0.146 | 0.412 |
| 960 | 0.146 | 0.404 |
| 1080 | 0.146 | 0.407 |
| 2500 | 0.146 | 0.526 |
| 5000 | 0.15 | 0.461 |
| 15000 | 15 | 4464.2 |

SUPPRESSOR 1

| Frequency Hz | CD Background, μS/cm | CD Baseline Noise, nS/cm |
|---|---|---|
| 0 | 0.245 | 0.356 |
| 5 | 0.251 | 0.36 |
| 10 | 0.242 | 0.293 |
| 120 | 0.226 | 0.278 |
| 480 | 0.149 | 0.351 |
| 500 | 0.236 | 0.319 |
| 600 | 0.139 | 0.307 |
| 720 | 0.091 | 0.262 |
| 840 | 0.095 | 0.28 |
| 960 | 0.1 | 0.28 |
| 1080 | 0.101 | 0.282 |
| 2500 | 0.28 | 0.411 |
| 5000 | 0.264 | 0.342 |
| 15000 | 18 | 20462.168 |

ELECTROLYTIC DEVICE NOISE REDUCTION AND LIFETIME IMPROVEMENT USING MODULATED DRIVER

TECHNICAL FIELD

The present disclosure is directed to suppressed ion chromatography.

BACKGROUND OF THE INVENTION

Suppressed ion chromatography (IC) is a benchmark technique for the trace level analysis of ions in aqueous solutions. The suppressor plays an important role in detection by eliminating the influence of the eluent ions while maximizing the response for fully dissociated analytes. Suppression in IC can be achieved in two primary ways, namely chemical suppression and electrolytic suppression.

While chemical suppression often provides low noise, it can involve a constant flux of regenerant supply and optimum regenerant concentration and flow rate to maintain the suppression reaction. Depending on the eluent type, the regenerant used is primarily dilute concentrations of sulfuric acid or Tetrabutylammonium hydroxide (TBAOH) which needs to be prepared and refilled periodically and generates a lot of waste.

On the other hand, with electrolytic suppression the regenerants are self-generated during electrolysis of water thereby eliminating manual intervention and reduces the risk of running out of the regenerant stream and causing poor suppressor performance. However, during the electrolytic process there is generation of oxygen and hydrogen gasses at the anode and cathode surface of the electrode which introduces unintended noise to the conductivity baseline.

BRIEF SUMMARY OF THE INVENTION

One embodiment under the present disclosure comprises an electrolytic suppressor system for an ion chromatography system. The system comprises a signal generator electrically coupled to a power supply and configured to modulate a current from the power supply; and an electrolytic suppressor configured to suppress eluent conductivity in an ion chromatography system, the electrolytic suppressor electrically coupled to the signal generator and configured to use the modulated current for power.

Another possible embodiment under the present disclosure comprises an ion chromatography system. The system comprises a pump configured to receive a liquid under process from a source and to provide force to push the liquid under process through the ion chromatography system; and an eluent generator downstream of the pump and configured to add an eluent to the liquid under process. It further comprises a continuously regenerated trap column downstream of the eluent generator and configured to remove contaminants from the liquid under process; a sample inject downstream of the continuously regenerated trap column and configured receive a test sample and mix the test sample into the liquid under process; and a separation column downstream of the sample inject and configured to separate one or more components from one or more test analytes of the liquid under process. It also comprises an electrolytic suppressor system comprising; a signal generator electrically coupled to a power supply and configured to modulate a current from the power supply; and an electrolytic suppressor configured to receive the liquid under process from the separation column and to suppress eluent conductivity in the one or more test analytes of the liquid under process, the electrolytic suppressor electrically coupled to the signal generator and configured to use the modulated current for power. It further comprises a conductivity detector configured to receive the liquid under process from the electrolytic suppressor and to detect one or more characteristics of the liquid under process.

A further possible embodiment comprises a method of operating an electrolytic suppressor in an ion chromatography system. The method comprises modulating a current at a predetermined frequency, the current configured to power the electrolytic suppressor; and powering the electrolytic suppressor with the modulated current, the electrolytic suppressor configured to suppress eluent conductivity in one or more test analytes of a liquid under process.

A further embodiment comprises a method of operating an ion chromatography system. The method comprises receiving a liquid under process at a pump; pumping the liquid under process through the system; adding, by an eluent generator, an eluent to the liquid under process; and removing, by a continuously regenerated trap column, contaminants from the liquid under process. It also comprises receiving, at a sample inject, a test sample into the liquid under process; separating, by a separation column, one or more components from one or more test analytes in the liquid under process; and modulating at a predetermined frequency, by a signal generator, a current received from a power supply. It also comprises powering an electrolytic suppressor with the modulated current; suppressing, by the electrolytic suppressor, eluent conductivity of the one or more test analytes in the liquid under process; and detecting, by a conductivity detector, one or more characteristics in the liquid under process.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawings, in which:

FIG. 14 shows sample data from Suppressor 1 and Suppressor 2;

DETAILED DESCRIPTION OF THE INVENTION

Before describing various embodiments of the present disclosure in detail, it is to be understood that this disclosure is not limited to the parameters of the particularly exemplified systems, methods, apparatus, products, processes, and/or kits, which may, of course, vary. Thus, while certain embodiments of the present disclosure will be described in detail, with reference to specific configurations, parameters, components, elements, etc., the descriptions are illustrative and are not to be construed as limiting the scope of the claimed invention. In addition, the terminology used herein is for the purpose of describing the embodiments and is not necessarily intended to limit the scope of the claimed invention.

Embodiments of the present disclosure include modulating the applied current in an IC system at an optimized frequency using an electrolytic modulated driver to control the uniformity and thereby minimizing bubble generation so to achieve lower conductivity noise, reduce heat generation, and extend the product lifetime compared to a constant current feed suppressor. This electrolytic modulation approach can be applicable to any electrolytic devices such as eluent generator and continuously regenerated trap column (CR-TC). Further, it has been demonstrated that if a very high frequency is applied, a non-suppressed state will be achieved, thus choosing an optimum modulation frequency is important to achieve an improved performance.

Figure 1:
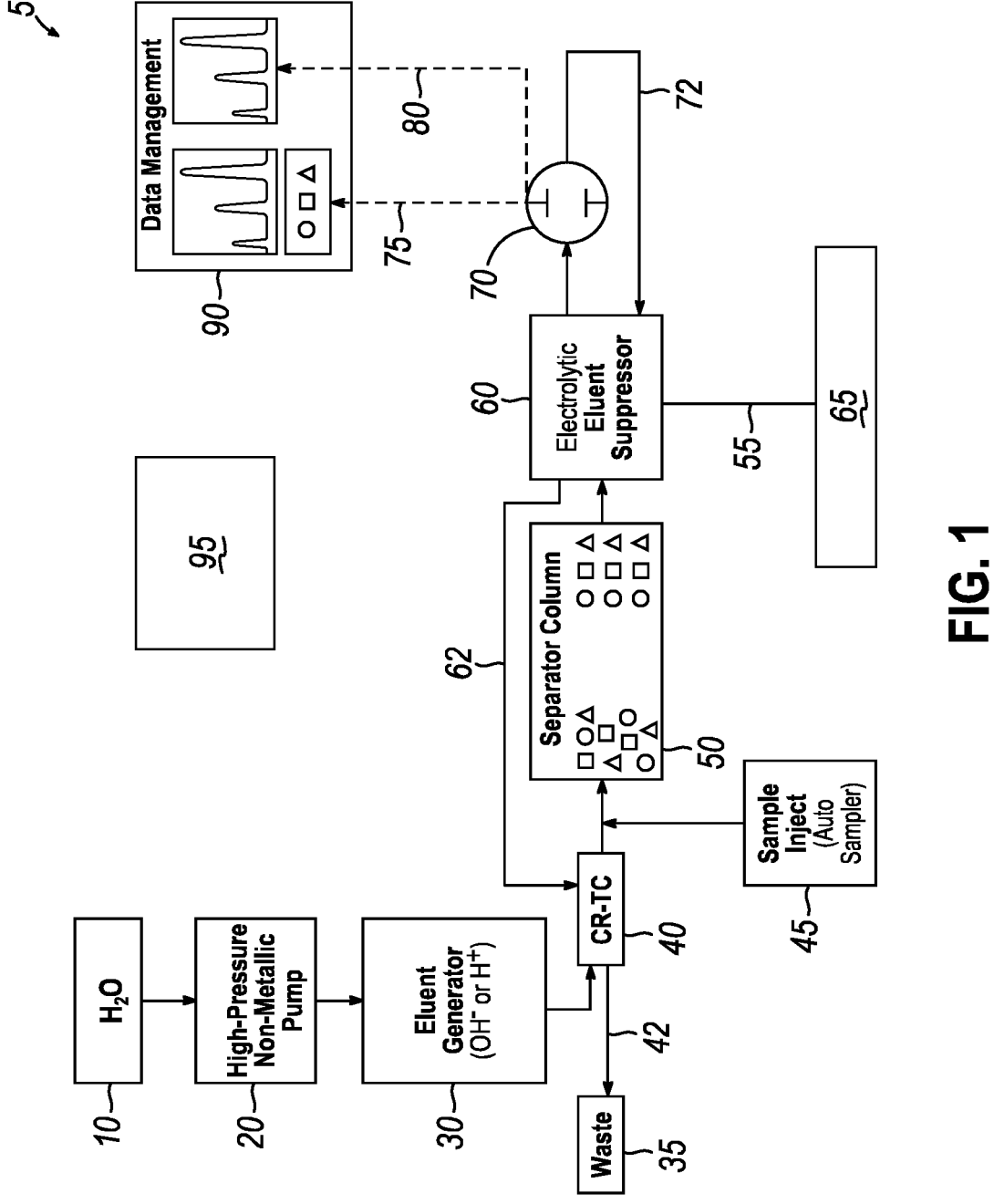
FIG. 1 illustrates an embodiment of an Ion Chromatography system set-up schematic using RFIC Eluent generation and Electrolytic suppressor.

FIG. 1 illustrates an embodiment of a suppressed reagent free IC (RFIC) system 5. RFIC system 5 may include a pump 20, an electrolytic eluent generator 30, a continuously regenerated trap column (CR-TC) 40, a sample injector 45, a separation column 50, an electrolytic suppressor 60, a detector 70, and a controller 95. Separation column 50 may be in the form of a capillary column or an analytical column. A recycle line 72, may be used to transfer the liquid from an output of detector 70 to an inlet of the electrolytic suppressor 60, recycle line 62 may be used to transfer liquid from an outlet of electrolytic suppressor 60 to an inlet of CR-TC 40, and recycle line 42 may be used to transfer liquid from an outlet of CR-TC 40 to waste 35.

Pump 20 can be configured to pump a liquid from a liquid reservoir or source 10 and be fluidically connected to electrolytic eluent generator 30. The liquid may be deionized water, an aqueous solution with electrolyte(s), or a mixture of an organic solvent with deionized water or with aqueous electrolyte(s) solution. A few example electrolytes are sodium acetate and acetic acid. The eluent mixture that contains an organic solvent may include a water miscible organic solvent such as, for example, methanol. Pump 20 can be configured to transport the liquid at a pressure ranging from about 20 PSI to about 15,000 PSI. Under certain circumstances, pressures greater than 15,000 PSI may also be implemented. It should be noted that the pressures denoted herein are listed relative to an ambient pressure (13.7 PSI to 15.2 PSI). Pump 20 may be in the form of a high-pressure liquid chromatography (HPLC) pump. In addition, pump 20 can also be configured so that the liquid only touches an inert portion of pump 20 so that a significant number of impurities do not leach out. In this context, significant means a number of impurities that would interfere with the intended measurement. For example, the inert portion can be made of polyetherether ketone (PEEK) or at least coated with a PEEK lining, which does not leach out a significant number of ions when exposed to a liquid.

An eluent is a liquid that contains an acid, base, salt, or mixture thereof and can be used to elute an analyte through a chromatography column. In addition, an eluent can include a mixture of a liquid and a water miscible organic solvent, where the liquid may include an acid, base, salt, or combination thereof. Electrolytic eluent generator 30 can be configured to generate a generant. A generant refers to a particular species of acid, base, or salt that can be added to the eluent. In an embodiment, the generant may be a base such as cation hydroxide or the generant may be an acid such as carbonic acid, phosphoric acid, acetic acid, methanesulfonic acid, or a combination thereof.

Referring to FIG. 1, eluent generator 30 can be configured to receive the liquid from pump 20 and then add an eluent to the liquid. The liquid containing the eluent can be outputted from eluent generator 30 to an inlet of CR-TC 40. CR-TC 40 is configured to remove cationic or anionic contaminants from the eluent. CR-TC 40 can include an ion exchange bed with an electrode at the eluent outlet. An ion exchange membrane interface can separate the eluent from a second electrode and contaminate ions can be swept through the ion exchange membrane towards the second electrode. In various embodiments, anion removal can utilize an anion exchange bed with a cathode at the eluent outlet separated from an anode by an anion exchange membrane. Alternatively, cation removal can utilize a cation exchange bed with an anode at the eluent outlet separated from a cathode by a cation exchange membrane. The contaminate ions can be swept out of CR-TC 40 using a recycled liquid via a recycle line 42.

An optional degasser (not shown) could be downstream of the CR-TC and may be used to remove residual gases in eluents. In an embodiment, a residual gas may be hydrogen and oxygen. A degasser may include a tubing section that is gas permeable and liquid impermeable such as, for example, amorphous fluoropolymers or more specifically Teflon AF.

The flowing liquid can be outputted from a degasser to sample injector 45 with a substantial portion of the gas removed. The gas can be swept out of the degasser using a recycled liquid via one of the recycle lines 42, 62. In other embodiments the degasser may comprise a port that vents to the ambient environment. Removed gas may be allowed to vent out through the port.

Sample injector 45 can be used to inject a bolus of a liquid sample into an eluent stream. The liquid sample may include a plurality of chemical constituents (i.e., matrix components) and one or more analytes of interest.

Separation column 50 can be used to separate various matrix components present in the liquid sample from the analyte(s) of interest. Separation column 50 may be in the form of a hollow cylinder that contains a packed stationary phase, other types of separation columns are possible. As the liquid sample flows through separation column 50, the matrix components and target analytes can have a range of retention times for eluting off of separation column 50. Depending on the characteristics of the target analytes and matrix components, they can have different affinities to the stationary phase in separation column 50. An output of separation column 50 can be fluidically connected to the electrolytic suppressor 60.

Electrolytic suppressor 60 can be used to reduce eluent conductivity background and enhance analyte response through efficient exchange of eluent counterions for regenerant ions. Electrolytic suppressor 60 can be supplied with a recycled liquid via a recycle line 72 that is downstream of detector 70. An output of electrolytic suppressor 60 can be fluidically connected to detector 70 to measure the presence of the separated chemical constituents of the liquid sample.

As illustrated in FIG. 1, the fluidic output of the eluent from detector 70 is recycled to electrolytic suppressor 60 via recycle line 72, the fluidic output of the electrolytic suppressor 60 is recycled to CR-TC 40 via recycle line 62, the fluidic output from CR-TC 40, via line 42, directs to waste 35.

Detector 70 may be in the form of a conductivity detector, an ultraviolet-visible spectrometer, a fluorescence spectrometer, an electrochemical detector, a conductometric detector, a charge detector, a charged aerosol detector, or a combination thereof. Details regarding the charge detector that is based on a charged barrier and two electrodes can be found in US Pre-Grant Publication No. 20090218238, which is hereby fully incorporated by reference herein. For electrolytic devices the recycle line is commonly used as it is the source of regenerant. In case of other detectors such as Mass spectrometers, an external water source can act as the regenerant source for the electrolytic devices. In embodiments with a charged aerosol detector the detector nebulizes the effluent flow and creates charged particles that can be measured as a current proportional to the analyte concentration. Details regarding the charged aerosol detector can be found in U.S. Pat. Nos. 6,544,484; and 6,568,245, which are hereby fully incorporated by reference herein.

As shown in FIG. 1, a controller 95 can be electronically coupled to one or all of the components of RFIC system 5. Controller 95 can comprise a microprocessor, timer, memory portion, connection to power supply, and be configured to apply a controlling signal. Controller 95 can be used to control the operation of RFIC system 5. Controller 95 may either be integrated into RFIC system 5 or be part of a personal computer (or other computing device) that communicates with RFIC system 5. Controller 95 may store instructions to set the magnitude and timing of the current waveform with respect to the switching of sample injector 45 that injects the sample.

When using an electrolytic suppressor 60, the suppressor cable 55 can be plugged to a power supply 65 which provides the required current for suppression. Power supply 65 can be the same power supply that powers controller 95 or a different one. In either case, controller 95 may control the functionality of electrolytic suppressor 60 and power supply 65.

Figure 2:
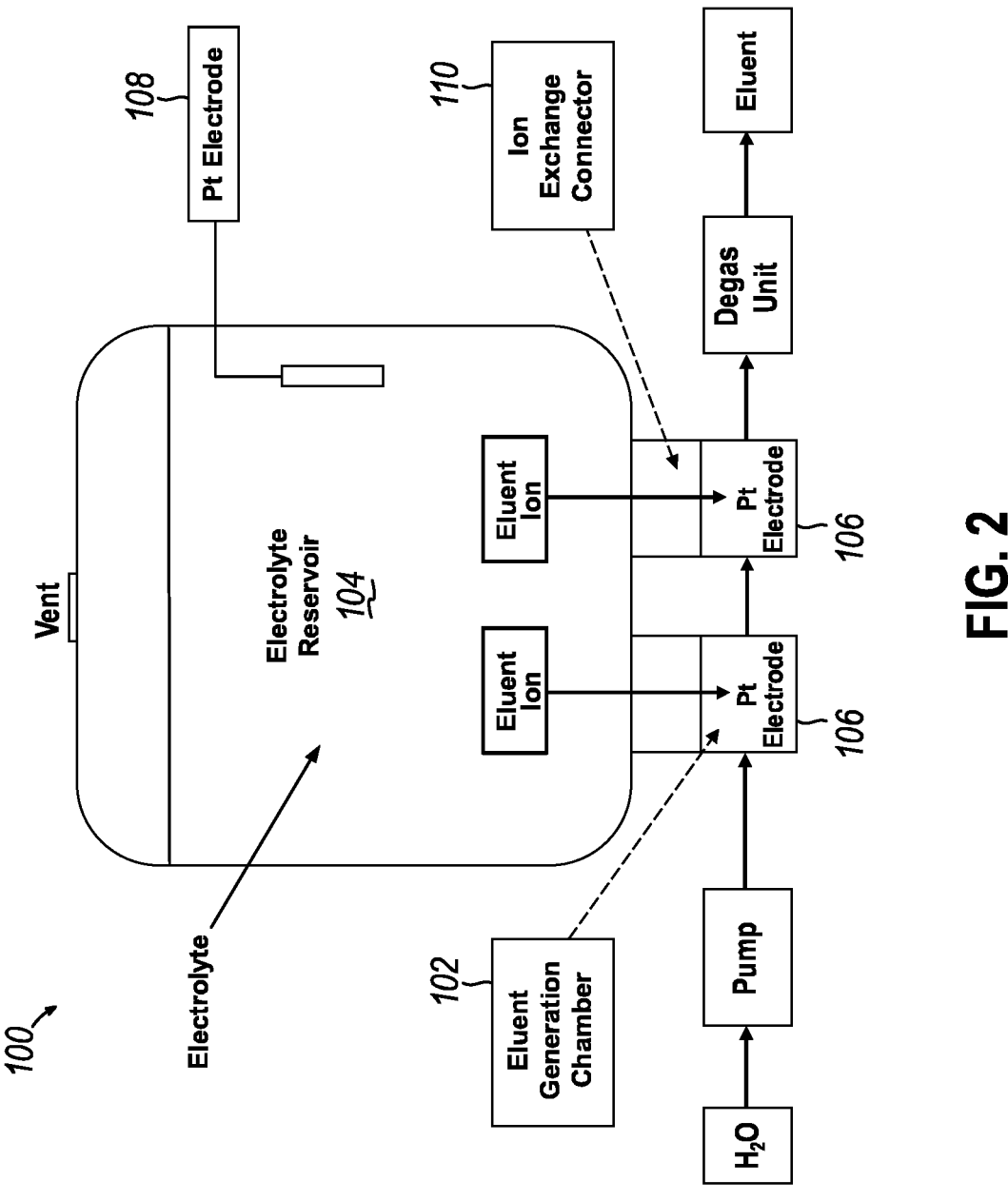
FIG. 2 illustrates the operating principle of an Eluent Generator Cartridge.

FIG. 2 illustrates the operation principle of an electrolytic eluent generator 100. Eluent generator 100 can include a high-pressure eluent generation chamber 102 and a low-pressure electrolyte reservoir 104. In various embodiments, the high-pressure generation chamber 102 can operate pressures greater than about 2,000 psi, such as at least about 5,000 psi, even at least about 10,000 psi, but not greater than about 30,000 psi, such as not greater than about 15,000 psi.

The eluent generation chamber 102 can contain a perforated platinum (Pt) electrode 106. The electrolyte reservoir 104 can contain a Pt electrode 108 and an electrolyte solution. In various embodiments, the electrolytic eluent generator cartridge 100 can produce a base, such as KOH, electrode 106 can be a cathode where hydroxide ions can be formed, and electrode 108 can be an anode. In other embodiments, the electrolytic eluent generator cartridge 100 can produce an acid, such as carbonic acid, phosphoric acid, acetic acid, methanesulfonic acid, electrode 106 can be an anode where hydronium ions can be formed, and electrode 108 can be a cathode. The eluent generation chamber 102 can be connected to the electrolyte reservoir 104 by means of an exchange connector 110 which can permit the passage of ions of only one charge from the electrolyte reservoir 104 into the high-pressure generation chamber 102. The exchange connector 110 can also serve the critical role of a high-pressure physical barrier between the low-pressure electrolyte reservoir 104 and the high-pressure generation chamber 102. In various embodiments, where the electrolytic eluent generator cartridge 100 is a base generator, the exchange connector 110 can permit the passage of cations while substantially preventing the passage of anions from the electrolyte reservoir 104 into the generation chamber 102. In alternate embodiments where the electrolytic generator 100 is an acid generator, the exchange connector 110 can permit the passage of anions while substantially preventing the passage of cations from the electrolyte reservoir 104 into the generation chamber 102. In various embodiments, the eluent generation chamber 102 and the ion exchange connector 110 can be assembled into an eluent generation cartridge.

To generate a KOH eluent, deionized water can be pumped through the eluent generation chamber 102 and a DC current can be applied between the electrode 108 and electrode 106. Under the applied electric field, the electrolysis of water can occur at both the electrode 108 and electrode 106 of the device 100. Water can be oxidized to form H+ ions and oxygen gas at electrode 108 in the electrolyte reservoir 104: $H_2O \rightarrow 2H+ + \frac{1}{2}O_2\uparrow + 2e-$. Water can be reduced to form OH− ions and hydrogen gas at electrode 106 in the KOH generation chamber 102: $2H_2O + 2e- \rightarrow 2OH- + H_2\uparrow$. As H+ ions, generated at the anode 106, displaces K+ ions in the electrolyte reservoir 104, the displaced ions can migrate across the cation exchange connector 110 into the eluent generation chamber 102. These K+ ions can combine with hydroxide ions generated at the cathode 106 to produce the KOH solution, which can be used as the eluent for anion exchange chromatography. The concentration of generated KOH can be determined by the current applied to the generator 100 and the carrier water flow rate through the generation chamber 102.

To generate a methanesulfonic acid eluent, deionized water can be pumped through the eluent generation chamber 102 and a DC current can be applied between the electrode 108 and electrode 106. Under the applied field, the electrolysis of water can occur at both the electrode 108 and electrode 106 of the eluent generator 100. Water can be oxidized to form H+ ions and oxygen gas at the electrode 106 in the KOH generation chamber 102: $H_2O \rightarrow 2H^+ + \frac{1}{2} O_2 \uparrow + 2e^-$. Water can be reduced to form OH– ions and hydrogen gas at the electrode 108 in the electrolyte reservoir 104: $2H_2O + 2e^- \rightarrow 2\ OH^- + H_2 \uparrow$. As OH– ions, generated at the electrode 106, displaces methanesulfonate ions in the electrolyte reservoir 204, the displaced ions can migrate across the anion exchange connector 110 into the eluent generation chamber 102. These methanesulfonate ions can combine with hydronium ions generated at the electrode 106 to produce the methanesulfonic acid solution, which can be used as the eluent for cation exchange chromatography. The concentration of generated methanesulfonic acid can be determined by the current applied to the generator 100 and the carrier water flow rate through the generation chamber 102.

Figure 3A:
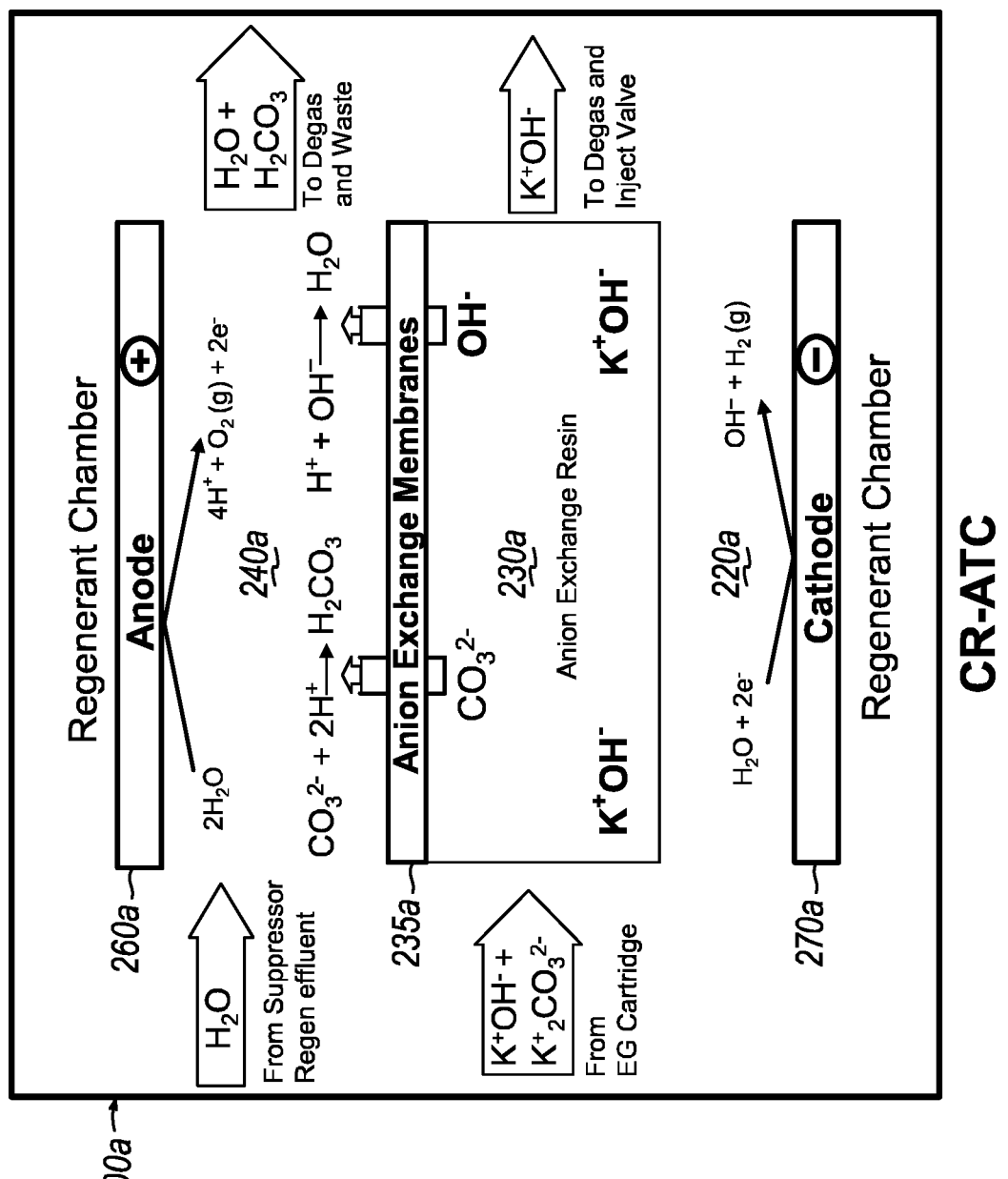
FIGS. 3A-3B illustrate operating principles of CR-TC embodiments.
Figure 3B:
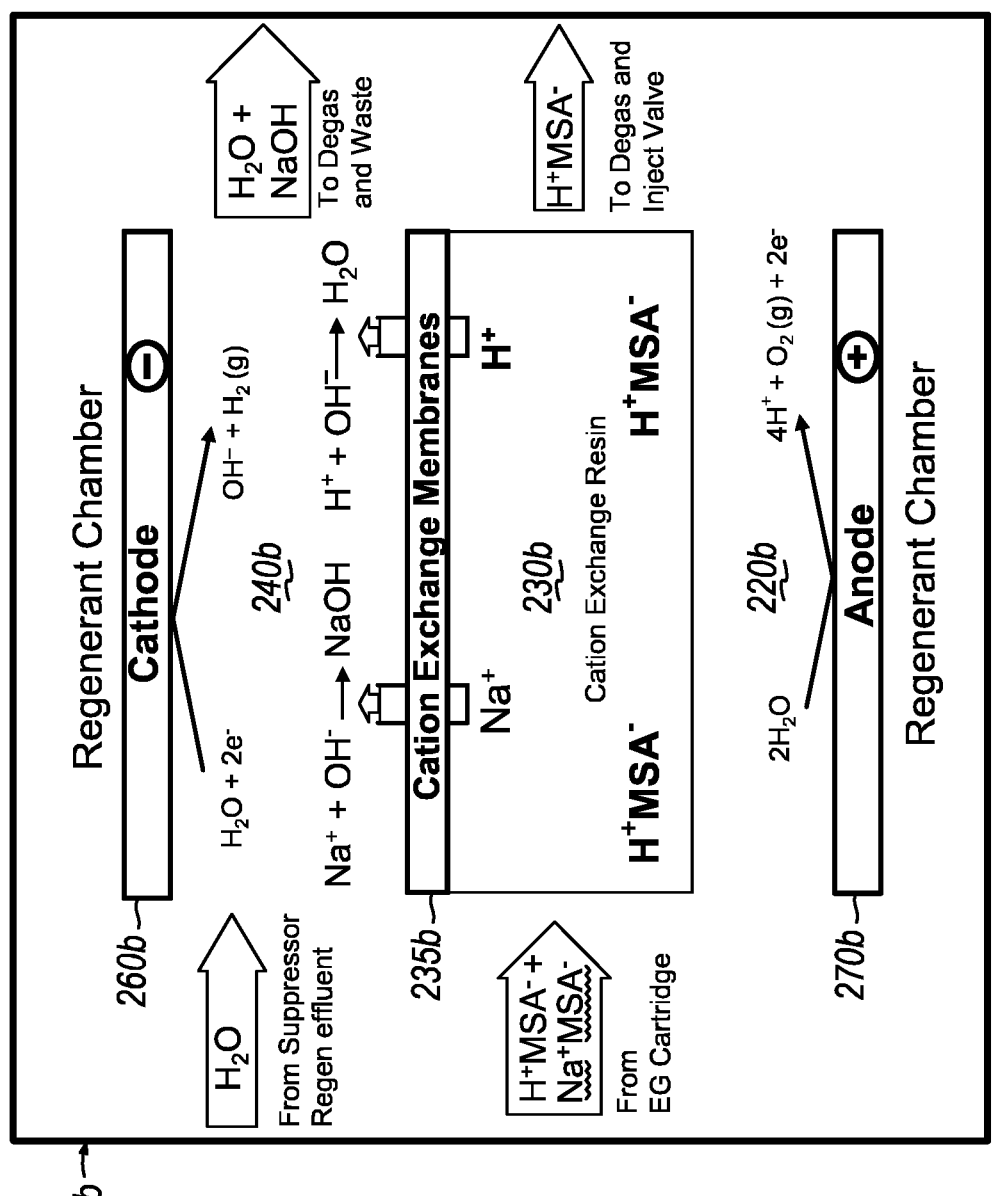

CRTC operation is illustrated in FIGS. 3A and 3B. CRTC 200a in FIG. 3A is a CR-ATC (continuously regenerated anion trap column) and CRTC 200b in FIG. 3B is a CR-CTC (continuously regenerated cation trap column). CR-ATC 200a utilizes an anion exchange membrane 235a while CR-CTC 200b utilizes a cation exchange membrane 235b. FIGS. 3A and 3B illustrate CRTC function and operation with possible eluents, but other eluents and other materials are possible. FIGS. 3A and 3B illustrate just two of many possibilities.

Referring first to FIG. 3A, $K^+OH^- + K^+_2CO_3{}^{2-}$ is supplied from the eluent generator (e.g., generator 100 in FIG. 2) into an anion exchange resin 230a within cathode chamber 220a. $H_2O$ is supplied from the suppressor effluent into anode chamber 240a and cathode chamber 220a. Cathode 270a applies a negative charge which helps to turn $H_2O + 2e^-$ into $OH^- + H_2(g)$. Anode 260a applies a positive charge which helps convert $2H_2O$ into $4H^+ + O_2(g) + 2e^-$. Anion exchange membranes 230a draw $CO_3{}^{2-}$ and $OH^-$ from to combine as follows: $CO_3{}^{2-} + 2H^+ \rightarrow H_2CO_3$, and $H^+ + OH^- \rightarrow H_2O$. As a result, $H_2O$ and $H_2CO_3$ are supplied to a degasser and waste. And K+OH– is supplied to a degasser and the inject valve as the process fluid.

Referring to FIG. 3B, $H^+MSA^- + Na^+MSA^{--}$ is supplied from the eluent generator into a cation exchange resin 230b within anode chamber 220b. $H_2O$ is supplied from the suppressor effluent into cathode chamber 240b and anode chamber 220b. Anode 270b applies a positive charge which helps to turn $2H_2O$ into $4H^+ + O_2(g) + 2e^-$. Cathode 260b applies a negative charge which helps convert $H_2O + 2e^-$ into $OH^- + H_2(g)$. Cation exchange membranes 230b draw $Na^+$ and $H^+$ from the eluent to combine as follows: $Na^+ + OH^- \rightarrow$ NaOH, and $H^+ + OH^- \rightarrow H_2O$. As a result, $H_2O$ and NaOH are supplied to a degasser and waste. And $H^+MSA^-$ is supplied to a degasser and the inject valve as the process fluid.

Figure 4:
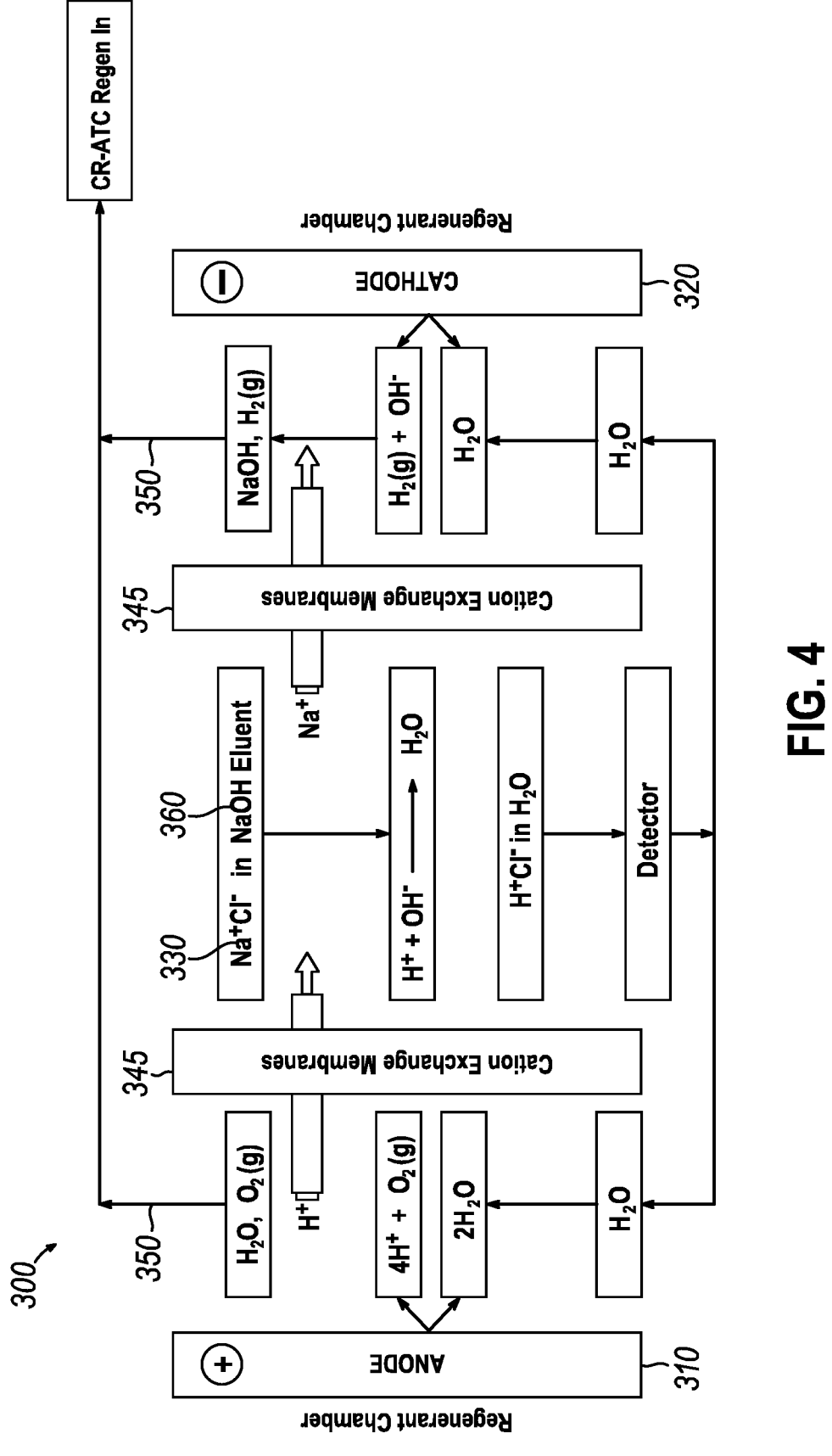
FIG. 4 shows an embodiment of a schematic of suppressor functionality.

An embodiment of an electrolytic suppressor 300 is shown in FIG. 4. Electrolytic suppressor 300 can be used to reduce eluent conductivity background and enhance analyte response through efficient exchange of eluent counterions for regenerant ions. Electrolytic suppressor 300 can include an anode chamber 310, a cathode chamber 320, and an eluent suppression bed chamber 330 separated by ion exchange membranes 345. The anode chamber 310 and/or cathode chamber 320 can produce regenerate ions 350 (in this example, $H^+$ including $H_2$, $O_2$ gases). The eluent suppression bed chamber 330 can include a flow path for the eluent 360 (in this case NaOH) separated from the regenerant 350 by an ion exchange barrier and eluent counterions can be exchanged with regenerate ions across the ion exchange barrier. Cathode chamber 320 or anode chamber 310 can be supplied a recycled liquid (e.g., $H_2O$) via a recycle line (e.g., recycle line 72 of FIG. 1). The output of electrolytic suppressor 300 can be fluidically connected to a conductivity detector (e.g., detector 70 of FIG. 1). As described above, one problem in the prior art was bubble generation in the electrolytic suppressor 300, leading to increased noise and less accurate results in RFIC systems.

The current requirement for a 100% current efficient suppressor is calculated based on Faraday's equation which is dependent on the eluent concentration and the application flow rate. To maintain suppression, generally for any given application the recommended applied current is set to 1.6-2 times higher than the theoretical current. The reason for applying such a higher current is because for most machines the cation and anion suppressor current efficiency ranges between 70-90%. It has previously been found that intermittent use of suppressor current or lowering the current at the outlet of the suppressor resulted in low noise. The higher the applied current, the higher will the device wattage be resulting in significant heat production and subsequent excessive bubble generation. It has been observed that increasing the applied current significantly increases the bubbles coming out from the regenerant compartment in a random fashion. Applicant has hypothesized that the bubbles which are generated at the electrode surface and are close in proximity to the ion exchange membrane surface covering the eluent channel can perturb the eluent flow dynamics and cause high noise.

Figure 5:
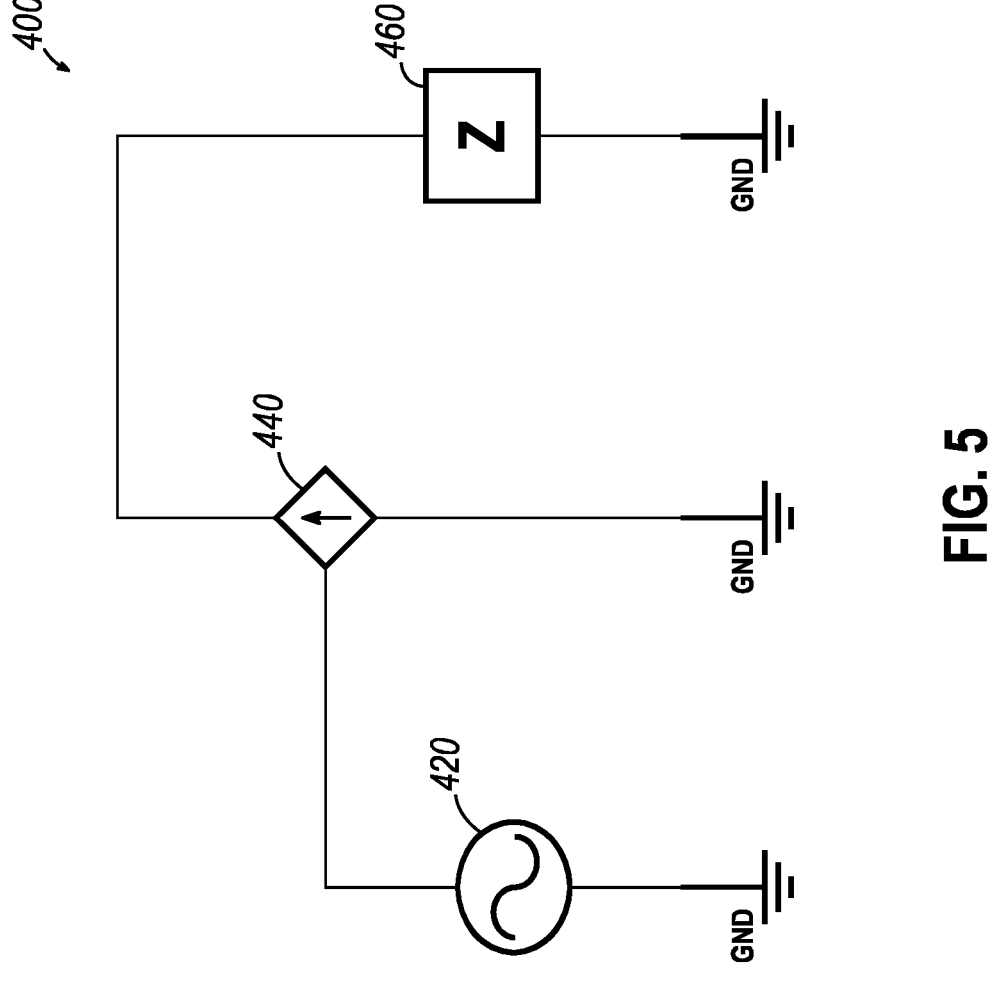
FIG. 5 illustrates a possible embodiment of an electrolytic device including suppressor, eluent generator (EGC), continuously regenerated trap column (CR-TC) with a power supply setup.

Certain embodiments under the present disclosure can minimize and control the bubble generation without lowering the suppressor applied current. One aspect of the solutions described is the use of a modulated current to drive the electrolytic suppressor. One such embodiment is shown in FIG. 5. System 400 includes a signal generator (e.g., a modulated driver) 420, combined with a constant current power supply 440. These drive the power supply of electrolytic suppressor 460 (such as electrolytic suppressor 60 of FIG. 1). Signal generator 420 can be controlled to modulate the drive current. For example, it can generate a 50% duty-cycle square-wave going from 0 mA to 50 mA at a certain frequency. Applicant has found that by applying certain frequencies the bubble generation is minimized, resulting in less noise and yielding more accurate results from e.g., RFIC system 5 of FIG. 1.

Figure 6:
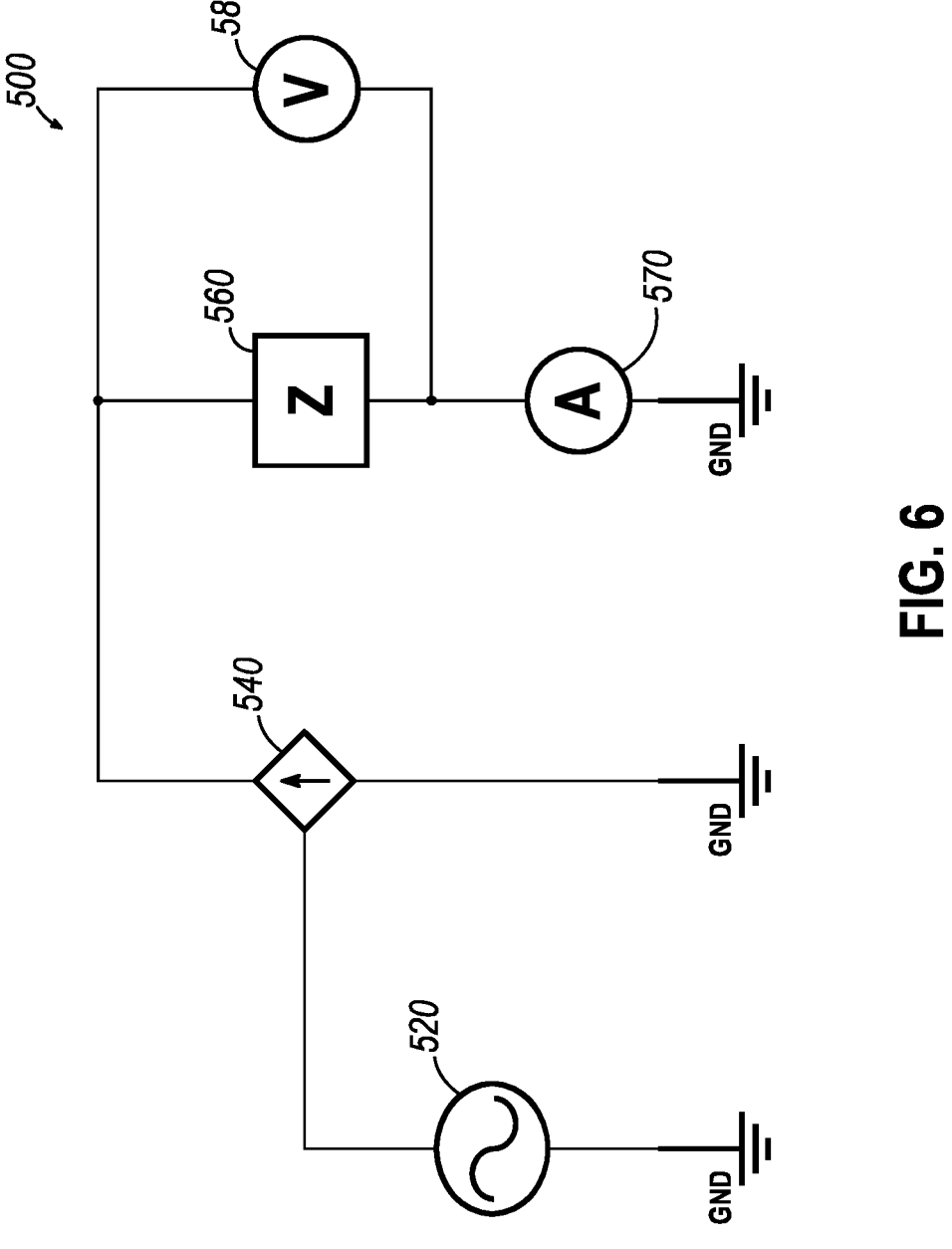
FIG. 6 illustrates a possible embodiment of an electrolytic device including suppressor, EGC and CR-TC with a power supply setup.

An alternative embodiment of an electrolytic suppressor is shown in FIG. 6. Electrolytic device 560 is coupled to a power supply 540 (e.g., a voltage controlled current source) and signal generator 520. Electrolytic device 560 in FIG. 6 can comprise a suppressor, EGC, and CRTC. Signal generator 520 can apply a modulation to modulate the current from power supply 540. Electrolytic device 560 can be subject to load voltage $V_{load}$ that can be tracked/measured by monitor 580 and load current $I_{load}$ that can be tracked/monitored by monitor 570. GND represents ground.

The signal generators and power supplies shown in FIGS. 5 and 6 can be controlled by a controller, such as controller 95 of FIG. 1. A controller 95 or power supply 440/540 can be preprogrammed with modulation settings or they may modulate frequency based on readings or measurements from an IC system, such as system 5 of FIG. 1. For example, modulation may be based on what frequency causes the lowest measured noise with the system or a component, which can vary depending on system configuration or specific models of components used. Modulation can be based on a measured stability of the system or any component. Modulation can also be varied actively, based on real-time measurements, such as measurements of flow rate, temperature, chemistry applications, or other variables. These measurements can be taken at any point, or multiple points, within an IC system.

Figure 7:
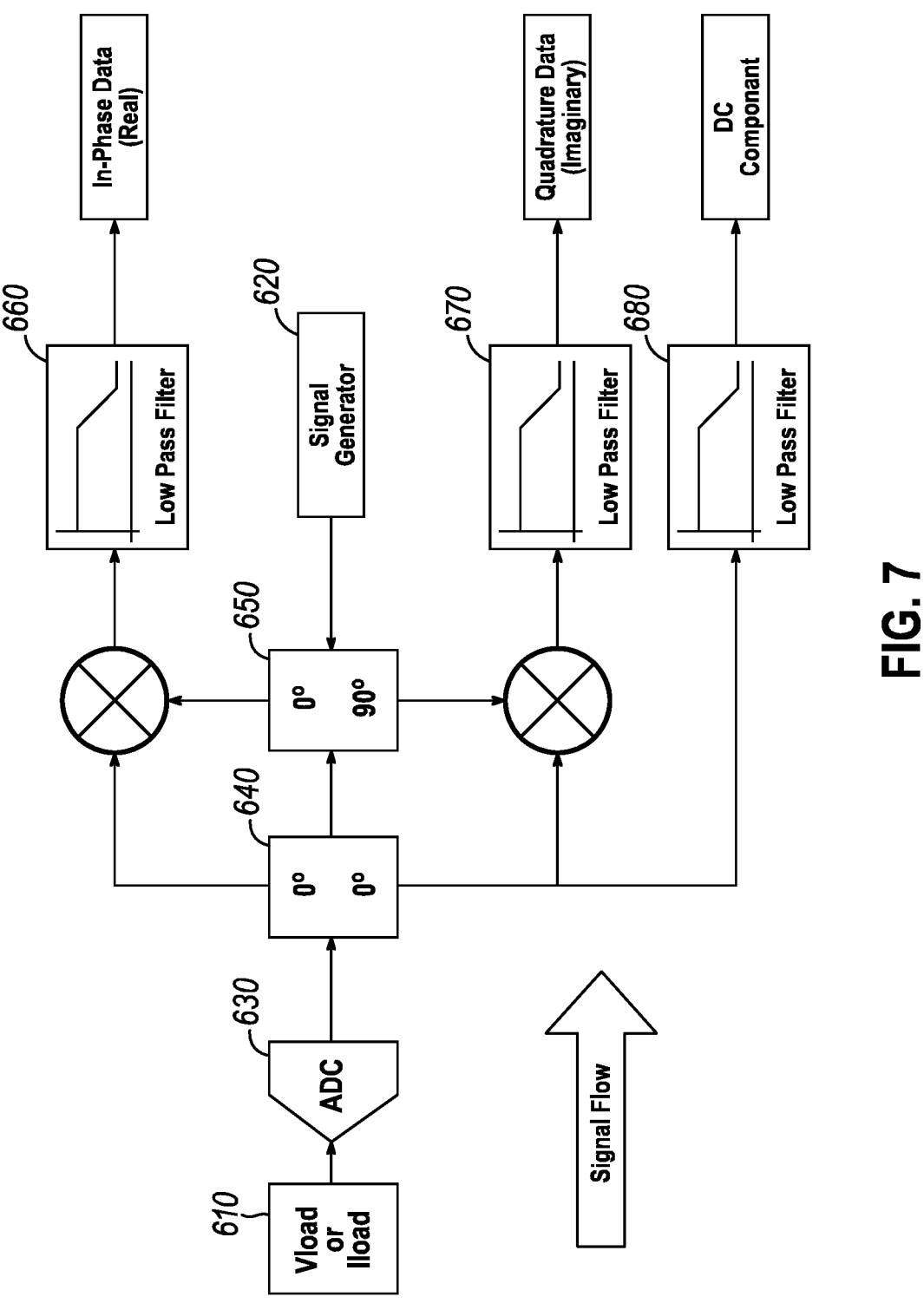
FIG. 7 schematic representation of how to convert the monitored voltage or current to a complex value.
Figure 8:
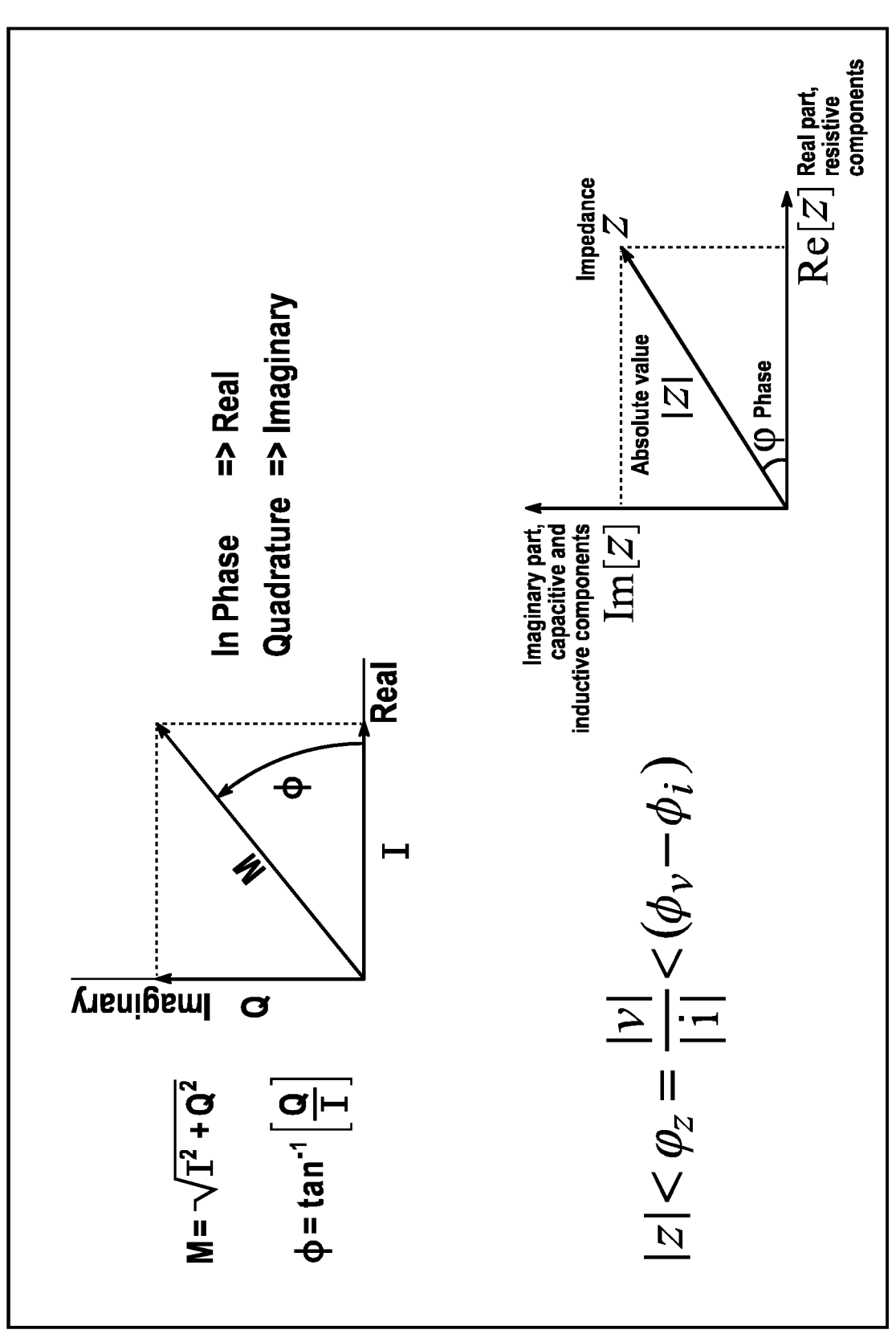
FIG. 8 shows the equations and graphical representations of the calculation of impedance.

FIG. 7 shows a schematic representation of how to convert the monitored voltage or current to a complex value. At 610, the $V_{load}$ or $I_{load}$ is input, and is combined with the modulated signal from signal generator 620. Digitizer 630 converts the $V_{load}$ or $I_{load}$ to a digital signal, which is then multiplied by a 0° in-phase sine wave at 640, and by a quadrature sine wave at 650. This yields the in-phase data 660 and the quadrature data 670. The output of 640 is also sent through a low pass filter 680 for use by DC components.

With the in-phase and quadrature data the impedance can be calculated. FIG. 7 shows the equations and graphical representations of the calculation. Graphing on the in-phase (real) and quadrature (imaginary) data on an xy axis can yield a value M with angle φ, given as follows:

$$M = \sqrt{I^2 + Q^2}$$

$$\varphi = \tan^{-1}\left[\frac{Q}{I}\right]$$

The impedance Z can then be obtained as follows:

$$|Z| < \varphi_Z = \frac{|\vartheta|}{|i|} < (\varphi_\theta - \varphi_i)$$

Figure 9:
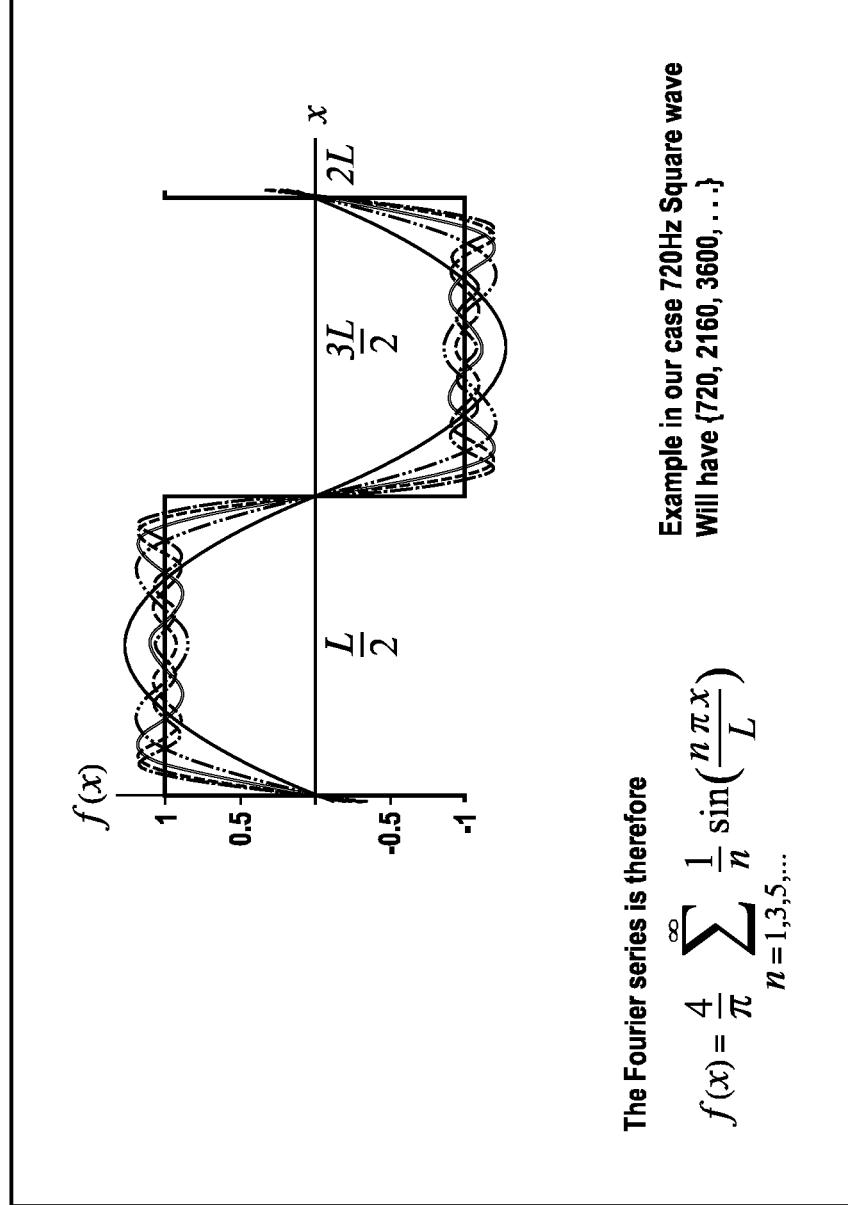
FIG. 9 shows an example of calculating harmonics.

Applying a modulated signal can result in harmonics. Harmonics can be calculated with a Fourier series. An example is shown in FIG. 9. A sample square wave is shown, with a resultant Fourier series given as:

$$f(x) = \frac{4}{\pi} \sum_{n=1,3,5\,\ldots}^{\infty} \frac{1}{n} \sin\left(\frac{n\pi x}{L}\right)$$

For the sample case of a frequency of 720 Hz, the harmonics will be 2160 Hz, 3600 Hz, etc.

Figures 10A, 10B, 10C, 10D, 10E:
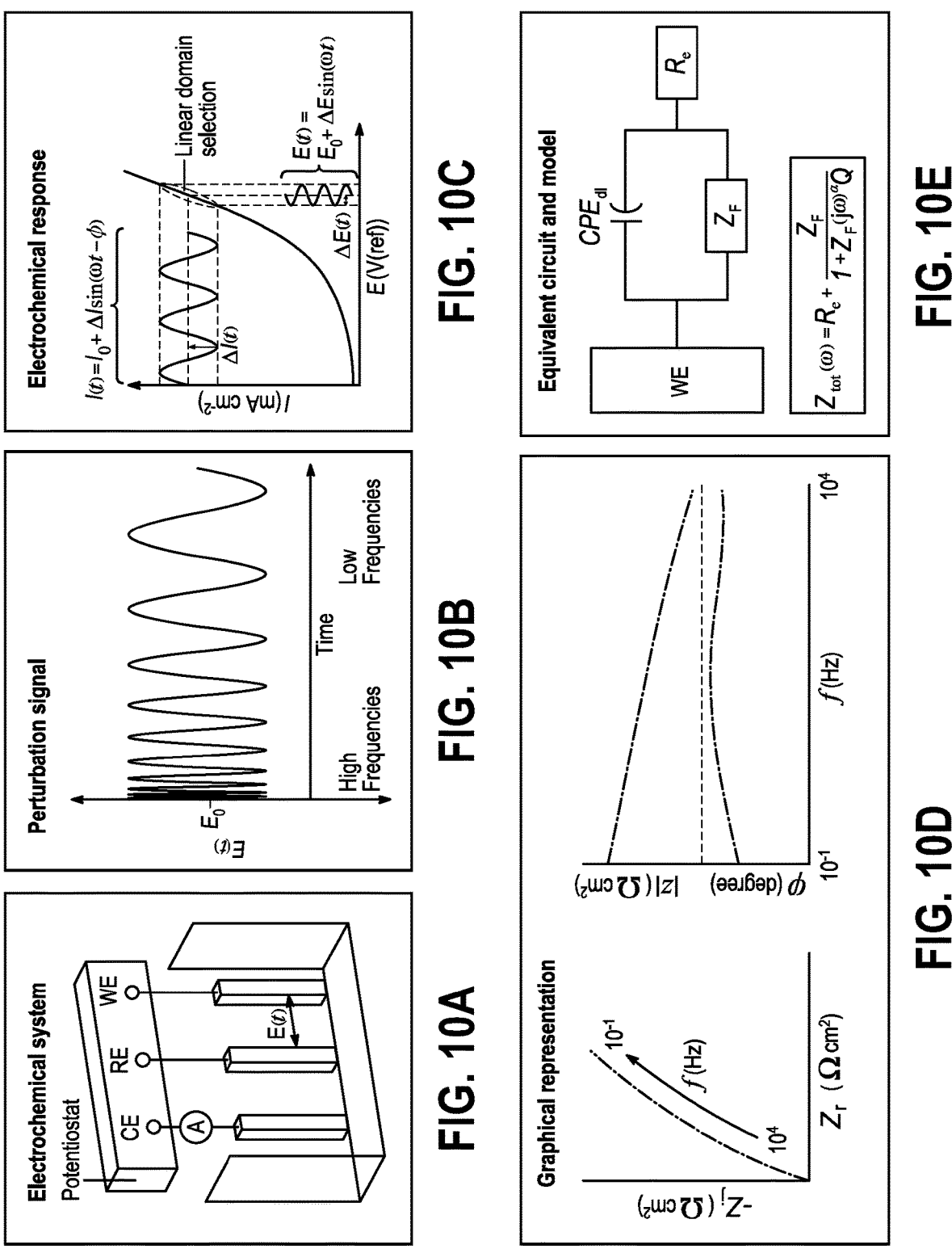
FIGS. 10A-10E show sample plots and representations related to impedance measurements.

Impedance scans can be used to assess a system, whether the given equations hold true or not can help in assessing a system's functionality. FIGS. 10A-10E show impedance scan plots. FIG. 10A shows a plot using a potentiostat, which should give three points for the embodiments discussed herein. FIG. 10B shows a perturbation signal. FIG. 10C shows a possible electrochemical response measurement. FIG. 10D shows a graphical representation of impedance. FIG. 10E shows an equivalent circuit with dual layer capacitance and an equation for Faraday impedance.

In regard to the electrolytic suppressor and the modulation of its power supply several conclusions can be made. In-situ monitoring of load impedance can be used to determine the wellness of the load (suppressor, ECG) by processing load voltage and/or load current. Load impedance monitoring can be added to the modulated EPS using the IQ demodulation block. Furthermore, complex impedance can be calculated from the IQ demodulation outputs.

Figure 11:
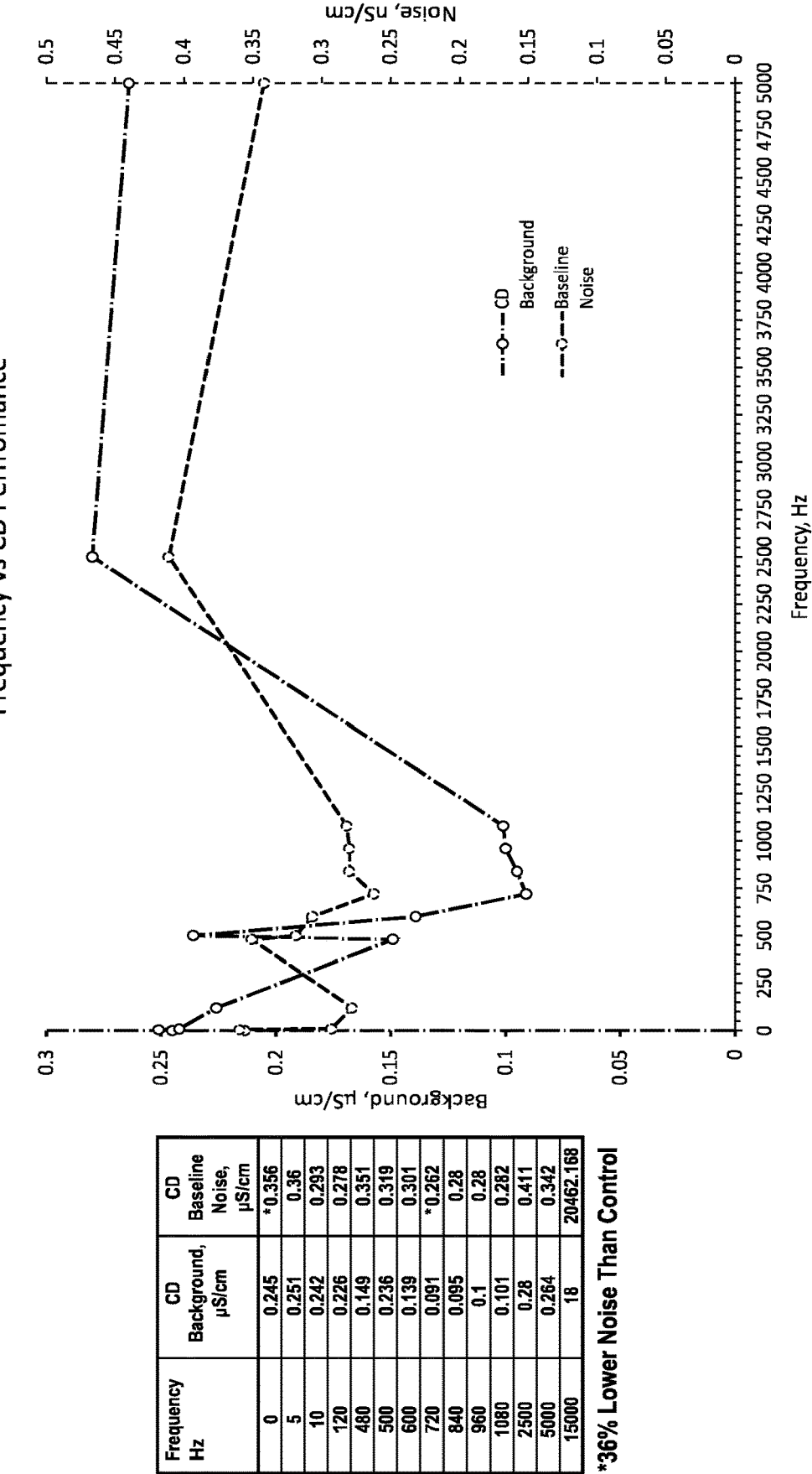
FIG. 11 shows an ADRS 600 4 mm Suppressor 1 frequency sweep study.
Figure 12:
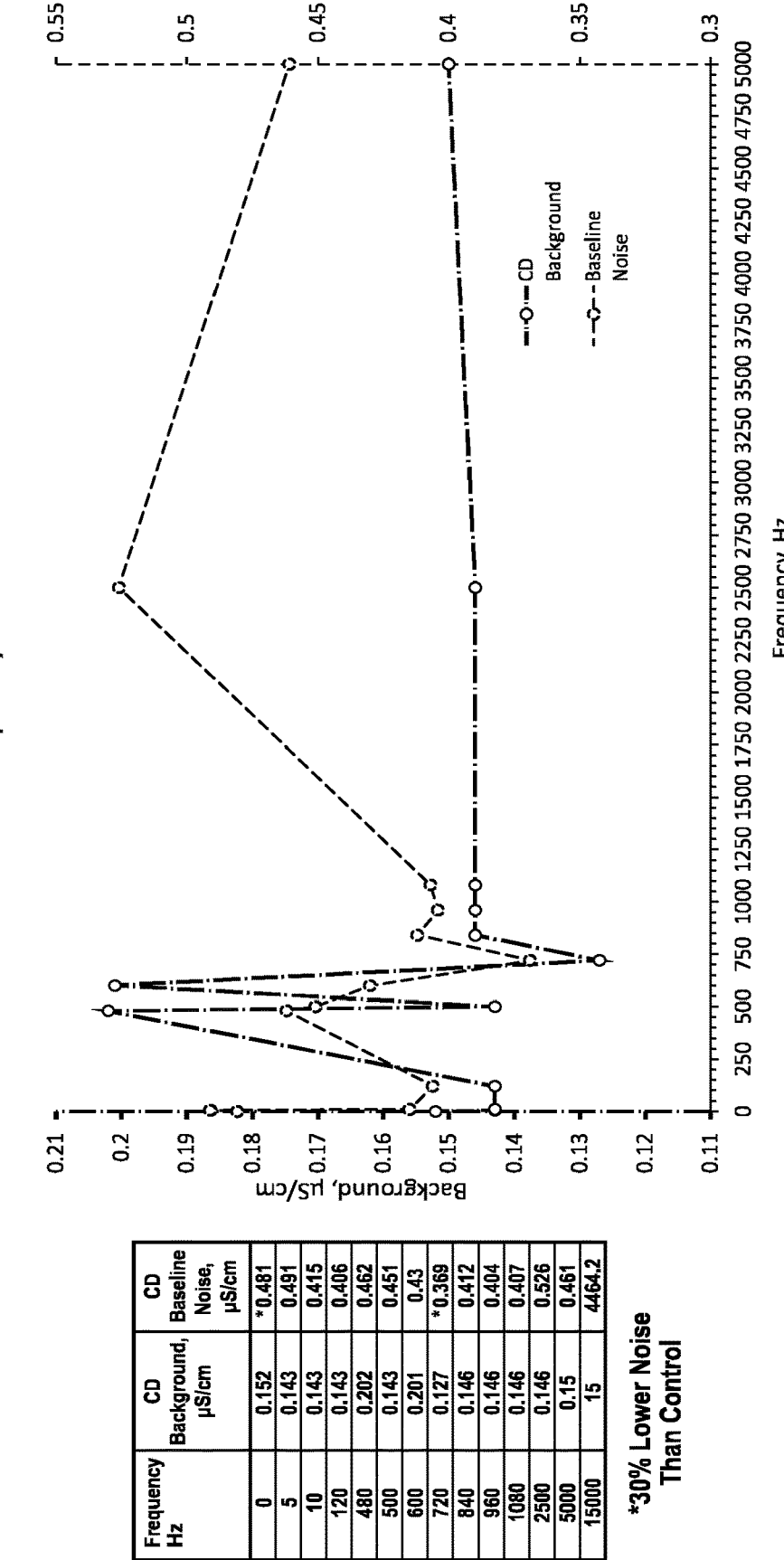
FIG. 12 shows an ADRS 600 4 mm Suppressor 2 frequency sweep study.
Figure 13:
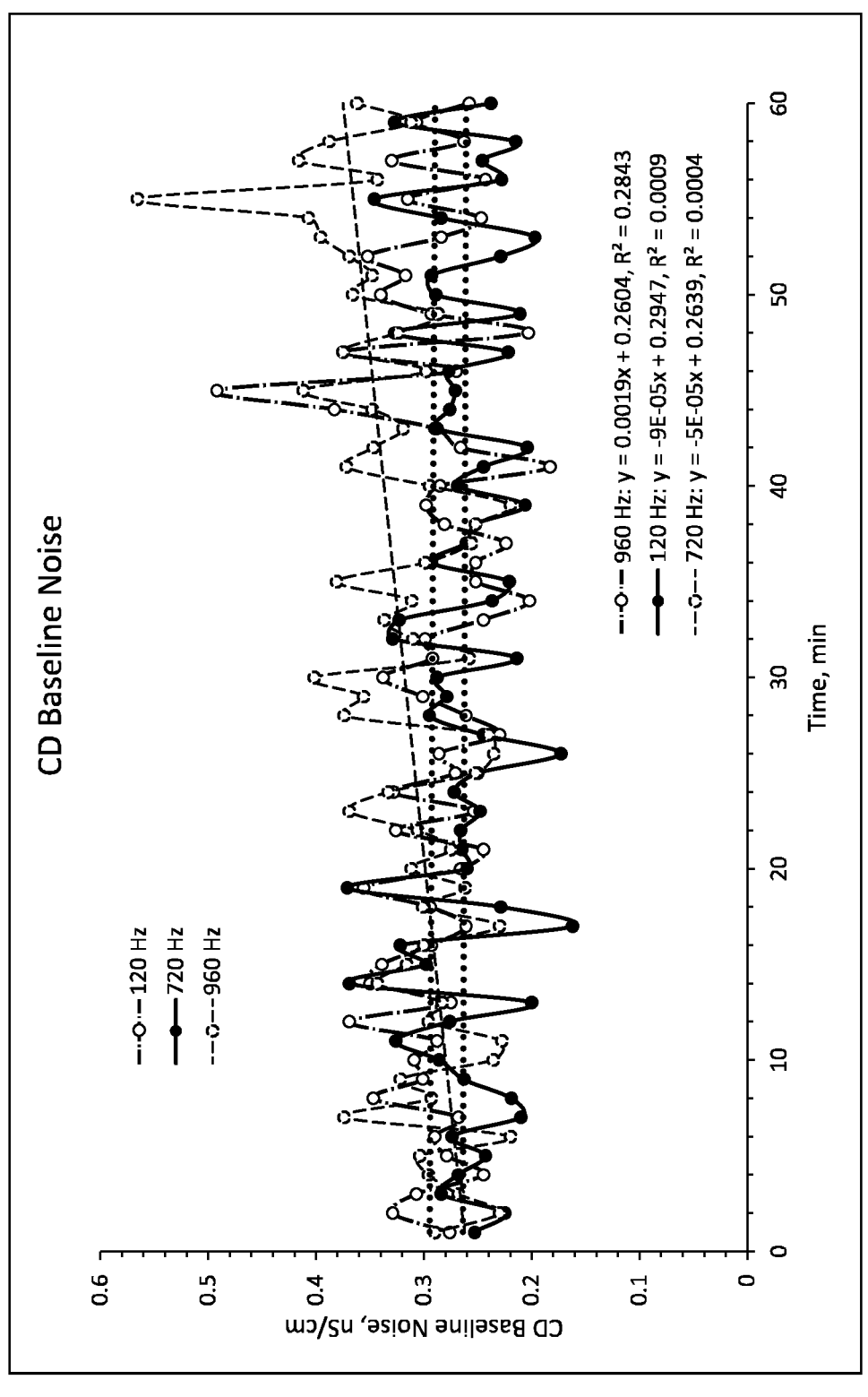
FIG. 13 shows a Suppressor 1 study at longer duration.

To determine the optimum frequency for the modulation described herein, a frequency sweep measurement was done against the suppressor baseline noise performance. Two anion dynamically regenerated suppressors (ADRS 600) were used for the frequency sweep study as shown in FIGS. 11-12. Based on the study, the lowest noise was achieved at 720 Hz frequency for both suppressors, showing an improvement of ~35% and ~30% for suppressor 1 (FIG. 11) and suppressor 2 (FIG. 12), respectively, compared to the constant current feed mode. Frequencies of around 120 and 960 Hz also showed low noise for both the suppressors. Further study was pursued with suppressor 1 at the selected frequencies (120, 720 and 960 Hz) to run at longer duration. As shown in FIG. 13, at 720 Hz frequency the lowest average noise of 0.262 nS/cm was observed, followed by 0.292 nS/cm at 120 Hz, and 0.319 nS/cm at 960 Hz, which is consistent with the findings from the frequency sweep study. Moreover, the correlation coefficient ($R^2$) at 720 Hz provided close to 0, indicating a stable noise performance throughout the entire duration of the study. Additionally, Applicant also found that if the modulation frequency is increased very high, it adversely affects the suppression by significantly increasing the background conductivity and the baseline noise leading to non-suppressed state (FIG. 14). Based on the findings, it can be inferred that coupling the modulating frequency to the suppressor or any electrolytic device power supply can lower baseline noise leading to improved signal to noise and life expectancy of the device.

While reference has been made to achieving beneficial results at frequencies such as 760 Hz, 120 Hz, and 960 Hz, it is to be understood that applying a frequency is not always a precise operation. Aiming to apply a frequency of 760 Hz, for example, often means applying a frequency that shows a variation of about 5 to 10 Hz in either direction. As a result, applying a frequency of 760 Hz can mean applying a frequency of 760±5-10 Hz, or ±5-10%. Different signal generators, electrolytic suppressors, and power supplies may have different accuracies.

Figure 15:
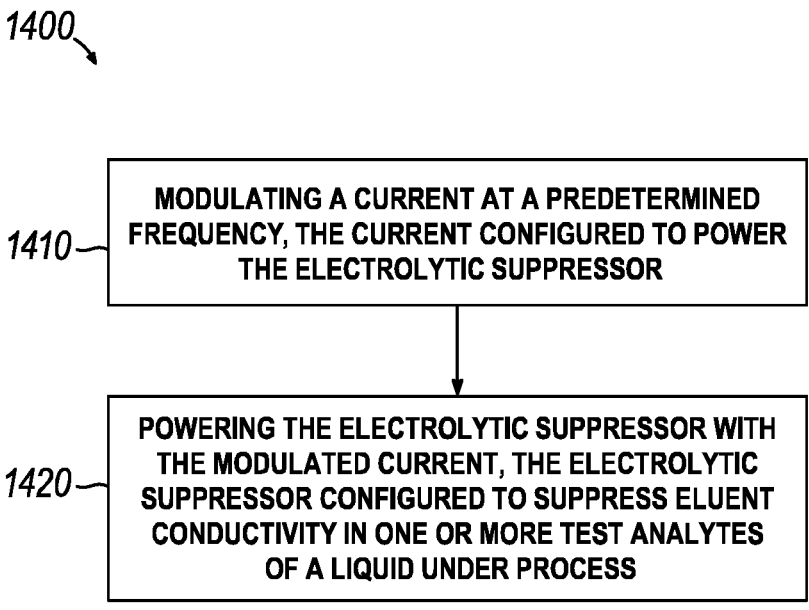
FIG. 15 shows a possible method embodiment under the present disclosure.

FIG. 15 displays a possible method embodiment under the present disclosure. Method 1400 is a method of operating an electrolytic suppressor in an ion chromatography system. Step 1410 is modulating a current at a predetermined frequency, the current configured to power the electrolytic suppressor. Step 1420 is powering the electrolytic suppressor with the modulated current, the electrolytic suppressor configured to suppress eluent conductivity in one or more test analytes of a liquid under process.

Figure 16:
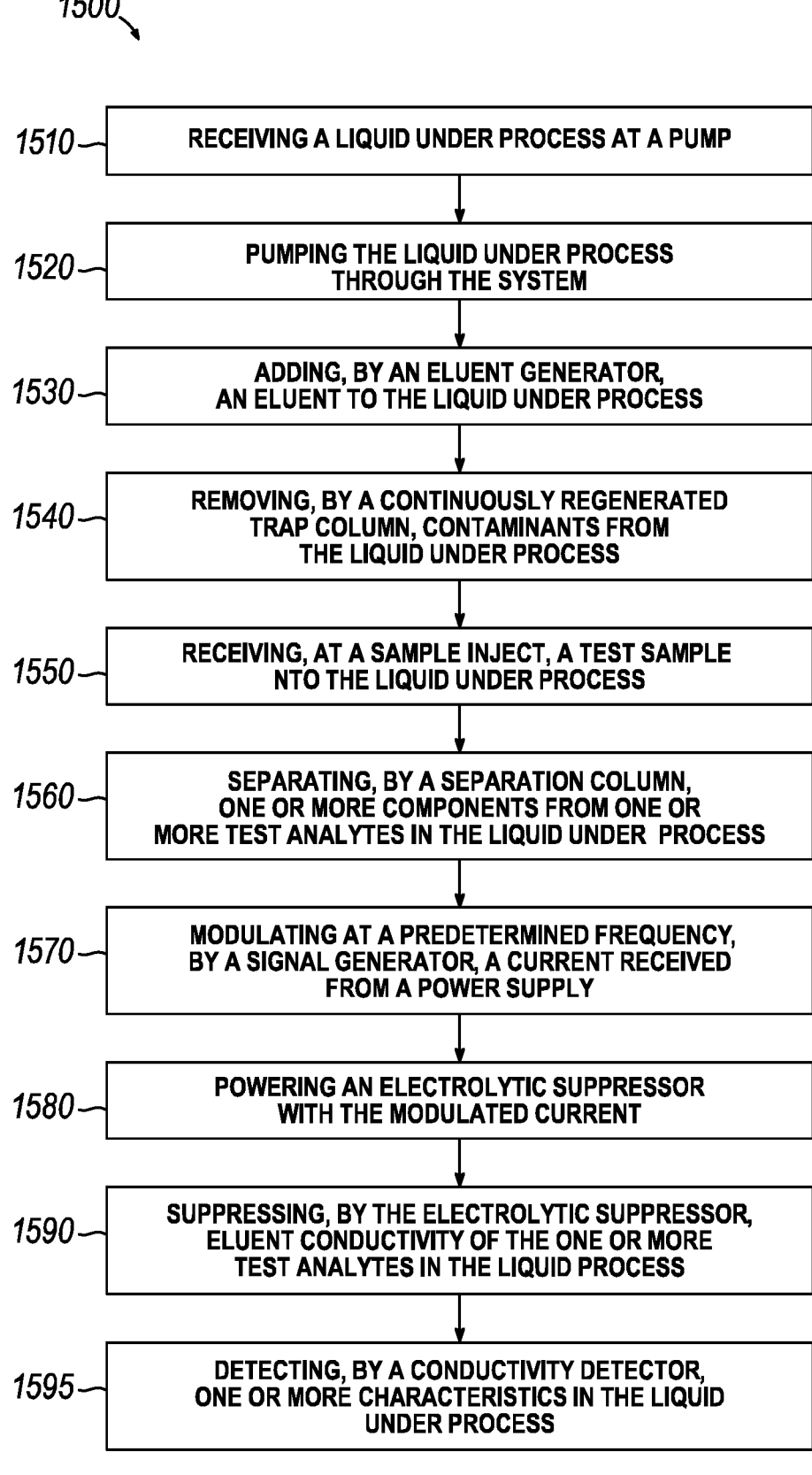
FIG. 16 shows a possible method embodiment under the present disclosure.

FIG. 16 shows another possible method embodiment under the present disclosure. Method 1500 is a method of operating an ion chromatography system. Step 1510 is receiving a liquid under process at a pump. Step 1520 is pumping the liquid under process through the system. Step 1530 is adding, by an eluent generator, an eluent to the liquid under process. Step 1540 is removing, by a continuously regenerated trap column, contaminants from the liquid under process. Step 1550 is receiving, at a sample inject, a test sample into the liquid under process. Step 1560 is separating, by a separation column, one or more components from one or more test analytes in the liquid under process. Step 1570 is modulating at a predetermined frequency, by a signal generator, a current received from a power supply. Step 1580 is powering an electrolytic suppressor with the modulated current. Step 1590 is suppressing, by the electrolytic suppressor, eluent conductivity of the one or more test analytes in the liquid under process. Step 1595 is detecting, by a conductivity detector, one or more characteristics in the liquid under process.

Computer Systems of the Present Disclosure

It will be appreciated that computer systems are increasingly taking a wide variety of forms. In this description and in the claims, the terms "controller," "computer system," or "computing system" are defined broadly as including any device or system- or combination thereof—that includes at least one physical and tangible processor and a physical and tangible memory capable of having thereon computer-executable instructions that may be executed by a processor. By way of example, not limitation, the term "computer system" or "computing system," as used herein is intended to include personal computers, desktop computers, laptop computers, tablets, hand-held devices (e.g., mobile telephones, PDAs, pagers), microprocessor-based or programmable consumer electronics, minicomputers, mainframe computers, multi-processor systems, network PCs, distributed computing systems, datacenters, message processors, routers, switches, and even devices that conventionally have not been considered a computing system, such as wearables (e.g., glasses).

The memory may take any form and may depend on the nature and form of the computing system. The memory can be physical system memory, which includes volatile memory, non-volatile memory, or some combination of the two. The term "memory" may also be used herein to refer to non-volatile mass storage such as physical storage media.

The computing system also has thereon multiple structures often referred to as an "executable component." For instance, the memory of a computing system can include an executable component. The term "executable component" is the name for a structure that is well understood to one of ordinary skill in the art in the field of computing as being a structure that can be software, hardware, or a combination thereof.

For instance, when implemented in software, one of ordinary skill in the art would understand that the structure of an executable component may include software objects, routines, methods, and so forth, that may be executed by one or more processors on the computing system, whether such an executable component exists in the heap of a computing system, or whether the executable component exists on computer-readable storage media. The structure of the executable component exists on a computer-readable medium in such a form that it is operable, when executed by one or more processors of the computing system, to cause the computing system to perform one or more functions, such as the functions and methods described herein. Such a structure may be computer-readable directly by a processor—as is the case if the executable component were binary. Alternatively, the structure may be structured to be interpretable and/or compiled—whether in a single stage or in multiple stages—so as to generate such binary that is directly interpretable by a processor.

The term "executable component" is also well understood by one of ordinary skill as including structures that are implemented exclusively or near-exclusively in hardware logic components, such as within a field programmable gate array (FPGA), an application specific integrated circuit (ASIC), Program-specific Standard Products (ASSPs), System-on-a-chip systems (SOCs), Complex Programmable Logic Devices (CPLDs), or any other specialized circuit. Accordingly, the term "executable component" is a term for a structure that is well understood by those of ordinary skill in the art of computing, whether implemented in software, hardware, or a combination thereof.

The terms "component," "service," "engine," "module," "control," "generator," or the like may also be used in this description. As used in this description and in this case, these terms-whether expressed with or without a modifying clause—are also intended to be synonymous with the term "executable component" and thus also have a structure that is well understood by those of ordinary skill in the art of computing.

While not all computing systems require a user interface, in some embodiments a computing system includes a user interface for use in communicating information from/to a user. The user interface may include output mechanisms as well as input mechanisms. The principles described herein are not limited to the precise output mechanisms or input mechanisms as such will depend on the nature of the device. However, output mechanisms might include, for instance, speakers, displays, tactile output, projections, holograms, and so forth. Examples of input mechanisms might include, for instance, microphones, touchscreens, projections, holograms, cameras, keyboards, stylus, mouse, or other pointer input, sensors of any type, and so forth.

Accordingly, embodiments described herein may comprise or utilize a special purpose or general-purpose computing system. Embodiments described herein also include physical and other computer-readable media for carrying or storing computer-executable instructions and/or data structures. Such computer-readable media can be any available media that can be accessed by a general purpose or special purpose computing system. Computer-readable media that store computer-executable instructions are physical storage media. Computer-readable media that carry computer-executable instructions are transmission media. Thus, by way of example—not limitation—embodiments disclosed or envisioned herein can comprise at least two distinctly different kinds of computer-readable media: storage media and transmission media.

Computer-readable storage media include RAM, ROM, EEPROM, solid state drives ("SSDs"), flash memory, phase-change memory ("PCM"), CD-ROM or other optical disk storage, magnetic disk storage or other magnetic storage devices, or any other physical and tangible storage medium that can be used to store desired program code in the form of computer-executable instructions or data structures and that can be accessed and executed by a general purpose or special purpose computing system to implement the disclosed functionality of the invention. For example, computer-executable instructions may be embodied on one or more computer-readable storage media to form a computer program product.

Transmission media can include a network and/or data links that can be used to carry desired program code in the form of computer-executable instructions or data structures and that can be accessed and executed by a general purpose or special purpose computing system. Combinations of the above should also be included within the scope of computer-readable media.

Further, upon reaching various computing system components, program code in the form of computer-executable instructions or data structures can be transferred automatically from transmission media to storage media (or vice versa). For example, computer-executable instructions or data structures received over a network or data link can be buffered in RAM within a network interface module (e.g., a "NIC") and then eventually transferred to computing system RAM and/or to less volatile storage media at a computing system. Thus, it should be understood that storage media can be included in computing system components that also—or even primarily—utilize transmission media.

Those skilled in the art will further appreciate that a computing system may also contain communication channels that allow the computing system to communicate with other computing systems over, for example, a network. Accordingly, the methods described herein may be practiced in network computing environments with many types of computing systems and computing system configurations. The disclosed methods may also be practiced in distributed system environments where local and/or remote computing systems, which are linked through a network (either by hardwired data links, wireless data links, or by a combination of hardwired and wireless data links), both perform tasks. In a distributed system environment, the processing, memory, and/or storage capability may be distributed as well.

Those skilled in the art will also appreciate that the disclosed methods may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

A cloud-computing model can be composed of various characteristics, such as on-demand self-service, broad network access, resource pooling, rapid elasticity, measured service, and so forth. A cloud-computing model may also come in the form of various service models such as, for example, Software as a Service ("SaaS"), Platform as a Service ("PaaS"), and Infrastructure as a Service ("IaaS"). The cloud-computing model may also be deployed using different deployment models such as private cloud, community cloud, public cloud, hybrid cloud, and so forth.

Abbreviated List of Defined Terms

To assist in understanding the scope and content of this written description and the appended claims, a select few terms are defined directly below. Unless defined otherwise, all technical and scientific terms used herein have the same meaning as commonly understood by one of ordinary skill in the art to which the present disclosure pertains.

The terms "approximately," "about," and "substantially," as used herein, represent an amount or condition close to the specific stated amount or condition that still performs a desired function or achieves a desired result. For example, the terms "approximately," "about," and "substantially" may refer to an amount or condition that deviates by less than 10%, or by less than 5%, or by less than 1%, or by less than 0.1%, or by less than 0.01% from a specifically stated amount or condition.

Various aspects of the present disclosure, including devices, systems, and methods may be illustrated with reference to one or more embodiments or implementations, which are exemplary in nature. As used herein, the term "exemplary" means "serving as an example, instance, or illustration," and should not necessarily be construed as preferred or advantageous over other embodiments disclosed herein. In addition, reference to an "implementation" of the present disclosure or invention includes a specific reference to one or more embodiments thereof, and vice versa, and is intended to provide illustrative examples without limiting the scope of the invention, which is indicated by the appended claims rather than by the following description.

As used in the specification, a word appearing in the singular encompasses its plural counterpart, and a word appearing in the plural encompasses its singular counterpart, unless implicitly or explicitly understood or stated otherwise. Thus, it will be noted that, as used in this specification and the appended claims, the singular forms "a," "an" and "the" include plural referents unless the context clearly dictates otherwise. For example, reference to a singular referent (e.g., "a widget") includes one, two, or more referents unless implicitly or explicitly understood or stated otherwise. Similarly, reference to a plurality of referents should be interpreted as comprising a single referent and/or a plurality of referents unless the content and/or context clearly dictate otherwise. For example, reference to referents in the plural form (e.g., "widgets") does not necessarily require a plurality of such referents. Instead, it will be appreciated that independent of the inferred number of referents, one or more referents are contemplated herein unless stated otherwise.

As used herein, directional terms, such as "top," "bottom," "left," "right," "up," "down," "upper," "lower," "proximal," "distal," "adjacent," and the like are used herein solely to indicate relative directions and are not otherwise intended to limit the scope of the disclosure and/or claimed invention.

CONCLUSION

It is understood that for any given component or embodiment described herein, any of the possible candidates or alternatives listed for that component may generally be used individually or in combination with one another, unless implicitly or explicitly understood or stated otherwise. Additionally, it will be understood that any list of such candidates or alternatives is merely illustrative, not limiting, unless implicitly or explicitly understood or stated otherwise.

In addition, unless otherwise indicated, numbers expressing quantities, constituents, distances, or other measurements used in the specification and claims are to be understood as being modified by the term "about," as that term is defined herein. Accordingly, unless indicated to the contrary, the numerical parameters set forth in the specification and attached claims are approximations that may vary depending upon the desired properties sought to be obtained by the subject matter presented herein. At the very least, and not as an attempt to limit the application of the doctrine of equivalents to the scope of the claims, each numerical parameter should at least be construed in light of the number of reported significant digits and by applying ordinary rounding techniques. Notwithstanding that the numerical ranges and parameters setting forth the broad scope of the subject matter presented herein are approximations, the numerical values set forth in the specific examples are reported as precisely as possible. Any numerical values, however, inherently contain certain errors necessarily resulting from the standard deviation found in their respective testing measurements.

Any headings and subheadings used herein are for organizational purposes only and are not meant to be used to limit the scope of the description or the claims.

The terms and expressions which have been employed herein are used as terms of description and not of limitation, and there is no intention in the use of such terms and expressions of excluding any equivalents of the features shown and described or portions thereof, but it is recognized that various modifications are possible within the scope of the invention itemed. Thus, it should be understood that although the present invention has been specifically disclosed in part by preferred embodiments, exemplary embodiments, and optional features, modification and variation of the concepts herein disclosed may be resorted to by those skilled in the art, and such modifications and variations are considered to be within the scope of this invention as defined by the appended items. The specific embodiments provided herein are examples of useful embodiments of the present invention and various alterations and/or modifications of the inventive features illustrated herein, and additional applications of the principles illustrated herein that would occur to one skilled in the relevant art and having possession of this disclosure, can be made to the illustrated embodiments without departing from the spirit and scope of the invention as defined by the items and are to be considered within the scope of this disclosure.

It will also be appreciated that systems, devices, products, kits, methods, and/or processes, according to certain embodiments of the present disclosure may include, incorporate, or otherwise comprise properties or features (e.g., components, members, elements, parts, and/or portions) described in other embodiments disclosed and/or described herein. Accordingly, the various features of certain embodiments can be compatible with, combined with, included in, and/or incorporated into other embodiments of the present disclosure. Thus, disclosure of certain features relative to a specific embodiment of the present disclosure should not be construed as limiting application or inclusion of said features to the specific embodiment. Rather, it will be appreciated that other embodiments can also include said features, members, elements, parts, and/or portions without necessarily departing from the scope of the present disclosure.

Moreover, unless a feature is described as requiring another feature in combination therewith, any feature herein may be combined with any other feature of a same or different embodiment disclosed herein. Furthermore, various well-known aspects of illustrative systems, methods, apparatus, and the like are not described herein in particular detail in order to avoid obscuring aspects of the example embodiments. Such aspects are, however, also contemplated herein.

All references cited in this application are hereby incorporated in their entireties by reference to the extent that they are not inconsistent with the disclosure in this application. It will be apparent to one of ordinary skill in the art that methods, devices, device elements, materials, procedures, and techniques other than those specifically described herein can be applied to the practice of the invention as broadly disclosed herein without resort to undue experimentation. All art-known functional equivalents of methods, devices, device elements, materials, procedures, and techniques specifically described herein are intended to be encompassed by this invention.

When a group of materials, compositions, components, or compounds is disclosed herein, it is understood that all individual members of those groups and all subgroups thereof are disclosed separately. When a Markush group or other grouping is used herein, all individual members of the group and all combinations and sub-combinations possible of the group are intended to be individually included in the disclosure. Every formulation or combination of components described or exemplified herein can be used to practice the invention, unless otherwise stated. Whenever a range is given in the specification, for example, a temperature range, a time range, or a composition range, all intermediate ranges and subranges, as well as all individual values included in the ranges given are intended to be included in the disclosure. All changes which come within the meaning and range of equivalency of the items are to be embraced within their scope.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. An electrolytic suppressor system for an ion chromatography system, comprising:
   a signal generator electrically coupled to a power supply and configured to modulate a current from the power supply; and
   an electrolytic suppressor configured to suppress eluent conductivity in an ion chromatography system, the electrolytic suppressor electrically coupled to the signal generator and configured to use the modulated current for power,
   wherein the modulated current has a frequency of 700-750 Hz, a frequency of 100-150 Hz, or a frequency of 925-975 Hz.

2. The electrolytic suppressor system of claim 1 wherein the electrolytic suppressor comprises a connection to a recycle line from a conductivity detector.

3. The electrolytic suppressor system of claim 1 wherein the electrolytic suppressor comprises a connection to a recycle line to a continuously regenerated trap column.

4. The electrolytic suppressor system of claim 1 further comprising a controller configured to control the modulation of the signal generator.

5. The electrolytic suppressor system of claim 1 wherein the electrolytic suppressor comprises;
   an anode chamber configured to produce first regenerate ions;
   a cathode chamber configured to produce second regenerate ions;
   an eluent suppression bed chamber configured to receive eluent from a separation column; and
   two or more ion exchange membranes separating the eluent suppression bed chamber from the anode and cathode chambers and configured to facilitate the exchange of counterions from the eluent with the first and second regenerate ions.

6. The electrolytic suppressor system of claim 1, wherein the signal generator modulates the current at a frequency based at least in part on active feedback from one or more system parameters.

7. The electrolytic suppressor system of claim 6, wherein the one or more system parameters comprise one or more of, flow rate, temperature, and chemistry application.

8. An electrolytic suppressor system for an ion chromatography system, comprising:

a signal generator electrically coupled to a power supply and configured to modulate a current from the power supply; and an electrolytic suppressor configured to suppress eluent conductivity in an ion chromatography system, the electrolytic suppressor electrically coupled to the signal generator and configured to use the modulated current for power, wherein the signal generator modulates the current at a frequency based at least in part on a measured noise and measured background stability.

9. An ion chromatography system comprising:

a pump configured to receive a liquid under process from a source and to provide force to push the liquid under process through the ion chromatography system;

an eluent generator downstream of the pump and configured to add an eluent to the liquid under process;

a continuously regenerated trap column downstream of the eluent generator and configured to remove contaminants from the liquid under process;

a sample inject downstream of the continuously regenerated trap column and configured receive a test sample and mix the test sample into the liquid under process;

a separation column downstream of the sample inject and configured to separate one or more components from one or more test analytes of the liquid under process;

an electrolytic suppressor system comprising;

a signal generator electrically coupled to a power supply and configured to modulate a current from the power supply, wherein the signal generator modulates the current at a frequency based at least in part on a measured noise and measured background stability; and an electrolytic suppressor configured to receive the liquid under process from the separation column and to suppress eluent conductivity in the one or more test analytes of the liquid under process, the electrolytic suppressor electrically coupled to the signal generator and configured to use the modulated current for power; and a detector configured to receive the liquid under process from the electrolytic suppressor and to detect one or more characteristics of the liquid under process.

10. The ion chromatography system of claim 9 wherein the detector comprises at least one of: a conductivity detector, an ultraviolet-visible spectrometer; a fluorescence spectrometer; an electrochemical detector; a conductometric detector; a charge detector; or a combination thereof.

11. The ion chromatography system of claim 9 wherein the electrolytic suppressor comprises;

an anode chamber configured to produce first regenerate ions;

a cathode chamber configured to produce second regenerate ions;

an eluent suppression bed chamber configured to receive the liquid under process from the separation column; and two or more ion exchange membranes separating the eluent suppression bed chamber from the anode and cathode chambers and configured to facilitate the exchange of counterions from the liquid under process with the first and second regenerate ions.

12. The ion chromatography system of claim 9 wherein the conductivity detector is configured to output data regarding the one or more characteristics to a data management system.

13. The ion chromatography system of claim 9 wherein the conductivity detector is configured to output data to a visual display.

14. The ion chromatography system of claim 9 further comprising at least one of, a first recycle line coupling a first fluid output of the conductivity detector to the electrolytic suppressor;

a second recycle line coupling a second fluid output of the electrolytic suppressor to the continuously regenerated trap column;

a third recycle line coupling a third fluid output of the continuously regenerated trap column to the waste.

15. The ion chromatography system of claim 9 further comprising a controller configured to control the flow of liquid under process and to adjust the signal generator.

16. A method of operating an electrolytic suppressor in an ion chromatography system, the method comprising:

modulating a current at a predetermined frequency, the current configured to power the electrolytic suppressor; and powering the electrolytic suppressor with the modulated current, the electrolytic suppressor configured to suppress eluent conductivity in one or more test analytes of a liquid under process.

17. The method of claim 16 further comprising;

directing the liquid under process through an eluent suppression bed chamber comprising the electrolytic suppressor; and facilitating an exchange of counterions from the liquid under process with first regenerate ions from an anode chamber and second regenerate ions from a cathode chamber, the anode and cathode chambers separated from the eluent suppression bed chamber by two or more ion exchange membranes.

18. The method of claim 16 further comprising directing a fluid outlet of the electrolytic suppressor to a recycle line coupled to a continuously regenerated trap column.

19. The method of claim 16 wherein the liquid under process entering the electrolytic suppressor comprises analyte salt in a basic eluent.

20. The method of claim 16 wherein the liquid under process exiting the electrolytic suppressor comprises acidic analyte in aqueous effluent.

21. The method of claim 16, wherein the electrolytic suppressor comprises an anion suppressor.

22. The method of claim 21, wherein the liquid under process entering the anion suppressor comprises Na+Cl— in NaOH eluent and the suppressed product comprises H+Cl— in $H_2O$.

23. A method of operating an ion chromatography system, the method comprising:

receiving a liquid under process at a pump;

pumping the liquid under process through the system;

adding, by an eluent generator, an eluent to the liquid under process;

removing, by a continuously regenerated trap column, contaminants from the liquid under process;

receiving, at a sample inject, a test sample into the liquid under process;

separating, by a separation column, one or more components from one or more test analytes in the liquid under process;

modulating at a predetermined frequency, by a signal generator, a current received from a power supply;

powering one or more components in the ion chromatography system with the modulated current, wherein the one or more components comprises at least one of an electrolytic suppressor; the eluent generator; or the continuously regenerated trap column;

suppressing, by the electrolytic suppressor, eluent conductivity of the one or more test analytes in the liquid under process; and detecting, by a conductivity detector, one or more characteristics in the liquid under process.

24. The method of claim 23 wherein the modulating comprises modulating at 700-750 Hz.

25. The method of claim 23 wherein the modulating comprises modulating at 100-150 Hz.

26. The method of claim 23 wherein the modulating comprises modulating at 925-975 Hz.

27. The method of claim 23 further comprising discarding, by the separation column, the one or more components.

28. The method of claim 23 wherein the suppressing comprises;

directing the liquid under process through an eluent suppression bed chamber comprising the electrolytic suppressor; and facilitating an exchange of counterions from the liquid under process with first regenerate ions from an anode chamber and second regenerate ions from a cathode chamber, the anode and cathode chambers separated from the eluent suppression bed chamber by two or more ion exchange membranes.

29. The method of claim 23, further comprising predicting performance of the one or more components based on measuring an impedance across the one or more components.

30. The method of claim 23, wherein the one or more components comprises an electrolytic suppressor, and the method further comprising measuring an impedance of the electrolytic suppressor and activating a hydration alarm if the impedance is higher than a predetermined value.

31. The method of claim 23, wherein the one or more components comprises an eluent generator, and the method further comprising measuring an impedance of the eluent generator and activating an equilibrium alarm if the impedance is lower than a predetermined value.

32. The method of claim 23, wherein the one or more components comprises an eluent generator, and the method further comprising measuring an impedance of the eluent generator and adjusting the impedance to optimize a reverse bias voltage and prevent chemical leakage.

* * * * *